(12) United States Patent
Harif

(10) Patent No.: US 8,500,586 B2
(45) Date of Patent: Aug. 6, 2013

(54) TRANSMISSION SYSTEM

(75) Inventor: Gershon Harif, Ramat Gan (IL)

(73) Assignee: G.R.G. Patents Ltd., Holon (IL)

( * ) Notice: Subject to any disclaimer, the term of this patent is extended or adjusted under 35 U.S.C. 154(b) by 641 days.

(21) Appl. No.: 12/451,173

(22) PCT Filed: Apr. 30, 2008

(86) PCT No.: PCT/IL2008/000573
§ 371 (c)(1),
(2), (4) Date: Oct. 29, 2009

(87) PCT Pub. No.: WO2008/132742
PCT Pub. Date: Nov. 6, 2008

(65) Prior Publication Data
US 2010/0130322 A1    May 27, 2010

(30) Foreign Application Priority Data

Apr. 30, 2007 (IL) .......................................... 182886

(51) Int. Cl.
*F16H 47/04* (2006.01)
*F16H 57/08* (2006.01)
(52) U.S. Cl.
USPC ............................................. 475/72; 475/338
(58) Field of Classification Search
USPC ........................................ 475/59, 72, 73, 338
See application file for complete search history.

(56) References Cited

U.S. PATENT DOCUMENTS

| 3,150,542 | A |   | 9/1964  | Baker |
|-----------|---|---|---------|-------|
| 3,209,618 | A | * | 10/1965 | Otto ................................ 475/56 |
| 3,314,307 | A | * | 4/1967  | Egbert ............................ 475/56 |
| 3,623,568 | A |   | 11/1971 | Mori |

(Continued)

FOREIGN PATENT DOCUMENTS

| AU | 2951171 A   | 12/1972 |
| DE | 1 775 216 A1 | 7/1971 |
| EP | 0 139 153 A1 | 5/1985 |
| EP | 0 833 079 A2 | 4/1998 |

OTHER PUBLICATIONS

International Search Report and Written Opinion from International Application No. PCT/IL2008/00573 mailed Aug. 26, 2008.

*Primary Examiner* — Roger Pang
(74) *Attorney, Agent, or Firm* — Workman Nydegger

(57) ABSTRACT

Provided is a transmission system including: a planetary gear, a first-side mechanism including a chamber and a first-side shaft connected to the chamber, at least one transfer arrangement, including a transfer mechanism and a transfer shaft connected thereto and a second-side mechanism including a second-side shaft. The planetary gear includes a planet carrier, at least one planet gear mounted thereon and at least one of a sun gear and a ring gear. The chamber is fluidly coupled to the transfer mechanism for transfer of rotary motion therebetween. The chamber is connected to one of the gear elements: a planet carrier, a sun gear, or a ring gear, the transfer shaft is connected to one of the gear elements: a planet carrier, a planet gear, a sun gear, or a ring gear, and the second-side shaft is connected to one of the gear elements: a planet carrier, a sun gear, or a ring gear. The connection is such that each of the gear elements: a planet carrier, a planet gear, a sun gear, or a ring gear is only coupled to one of the chamber, the transfer shaft and the second-side shaft.

20 Claims, 22 Drawing Sheets

U.S. PATENT DOCUMENTS

| | | | | |
|---|---|---|---|---|
| 3,772,939 A | * | 11/1973 | Hause | 475/46 |
| 3,789,697 A | * | 2/1974 | Hobbs | 475/40 |
| 4,003,273 A | * | 1/1977 | Miller | 475/54 |
| 4,413,535 A | * | 11/1983 | Hobbs | 475/41 |
| 4,602,522 A | * | 7/1986 | Dorpmund | 475/56 |
| 5,122,104 A | | 6/1992 | Ohkubo | |
| 5,466,196 A | * | 11/1995 | Ra et al. | 475/59 |
| 2008/0119316 A1 | * | 5/2008 | Ordo | 475/59 |

* cited by examiner

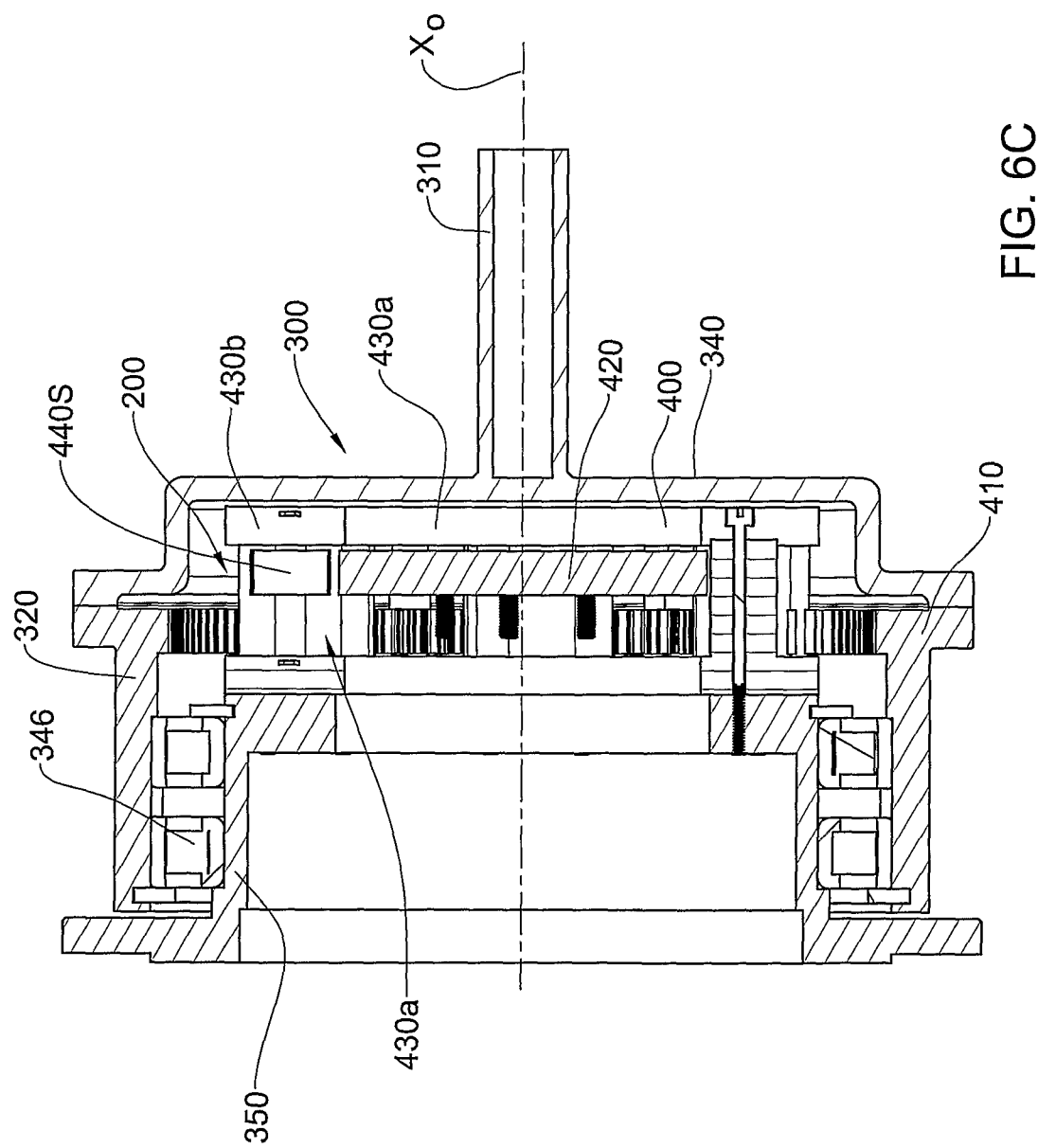

TRANSMISSION SYSTEM

This is a National Phase Application filed under 35 U.S.C. 371 as a national stage of PCT/IL2008/000575, filed Apr. 30, 2008, the content of which is hereby incorporated by reference in its entirety.

FIELD OF THE INVENTION

This invention relates to gear transmissions, in particular, gear transmissions involving planetary gears.

BACKGROUND OF THE INVENTION

Planetary gear assemblies, also referred to as epicyclic gear assemblies, are widely used in transmission systems. With reference to FIGS. 1A and 1B, a planetary gear generally designated PG is shown comprising a sun gear S, a ring gear R, and a planet carrier C carrying four planet gears P. Each of the sun gear S, planet gears P and ring gear R is formed with gear teeth (not shown) on the outer circumference thereof.

The sun gear S, ring gear R and planet carrier C are arranged concentrically about a central axis X in a manner allowing rotation thereof with respect to one another. Each of the planet gears P has an auxiliary axis Y, and is so mounted on the carrier C as to allow rotation thereof about its auxiliary axis Y. In assembly, the teeth of each planet gear P mesh with the teeth of the sun gear S on one hand, and with the teeth of the ring gear R on the other hand.

The planet carrier C, planets P, ring gear R, sun gear S and constitute a group of gear elements, co-axially arranged about a central axis X. In operation, one of the elements of the group, e.g. planet carrier P, is held stationary, another element, e.g. sun gear S is connected to an input drive to facilitate rotary motion thereof, and rotary motion is thereby imparted to the third element and/or the planet gears P as output. Thus, the planetary gear system may operate at least at any one of the operational modes described in the following table:

TABLE 1

| Operational mode | Stationary | Input | Output |
| --- | --- | --- | --- |
| 1 | Ring gear | Planet carrier | Sun gear |
| 2 | Planet carrier | Ring gear | Sun gear |
| 3 | Ring gear | Sun gear | Planet carrier |
| 4 | Sun gear | Ring gear | Planet carrier |
| 5 | Planet carrier | Sun gear | Ring gear |
| 6 | Sun gear | Planet carrier | Ring gear |

The transmission ratio D between the input rotary speed and the output rotary speed is determined according to the number of gear teeth of each of the sun gear S, planet gears P, planet carrier C and ring gear R.

Planetary gear assemblies are commonly used in automatic transmissions, for example for automotive vehicles, since they conveniently permit gear ratios to be smoothly changed by merely holding one of the components stationary.

Planetary gear assemblies are used in a large number of other applications for driving various types of electrical devices, such as milling machines, drilling tools, etc.

In particular, planetary gear assemblies are used in automotive vehicles. In this case, the planetary gear assembly forms a part of a hydraulic transmission. In such transmissions, a fluid coupling, or torque converter, and planetary gear sets are used to provide a wide range of torque multiplication.

With reference to FIG. 1C, a standard fluid coupling usually comprises an impeller $C_I$ and a rotor $C_R$ each having a plurality of blades adapted to circulate a fluid when set in rotary motion about their central axis X. The arrangement is such that in the presence of a fluid medium, for example oil, rotation of the impeller $C_I$ entails rotation of the rotor $C_R$ and vice versa due to circulation of the oil between the two.

In the automotive field, as well as in other fields of motorized operations, the behavior of the operated system in its initial stage is very important, i.e. behavior of the system from the moment the motor is turned on and until it reaches its desired RPM. For example, in a vehicle, it is desired to quickly accelerate at the beginning of the ride to a desired speed.

In most fluid couplings comprising an impeller $C_I$ and rotor $C_R$ (sometimes referred to as a 'turbine'), the fluid coupling encounters a problem when the impeller begins rotating. This is caused mainly because the rotor hasn't picked up enough speed yet, whereby the oil circulated by the impeller and passing through the blades of the rotor tends to exit the blades of the rotor and impact the blades of the impeller in a manner applying a counter pressure in a direction opposite to the revolution of the impeller, thereby slowing it down. It is noted that this problem disappears when the impeller $C_I$ and rotor $C_R$ revolve at similar speeds.

This problem has been tackled by a variety of solutions, the most common of which is a stator. The stator arrangement comprises a plurality of blades, and is designed such that initially, when the impeller arrangement begins revolving at low speed, the blades of the stator direct the oil to impact the impeller blades at the proper angle. Thereafter, the rotor begins picking up speed and the stator is allowed to revolve along with the impeller and rotor, thereby providing a clean continuous start-up of the system.

In modern day vehicles, the stator arrangement is controlled by a computerized controller which commands the stator to begin revolving with the impeller and rotor once it detects that the rotor has reached a predetermined speed limit.

SUMMARY OF THE INVENTION

According to the present invention there is provided a transmission system comprising:
 a planetary gear comprising the following gear elements:
 i a planet carrier;
 ii at least one planet gear mounted on said planet carrier; and at least one of:
 iii a sun gear; and
 iv a ring gear;
 a first-side mechanism comprising a chamber and a first-side shaft having a connection end connected to said chamber, and a free end;
 at least one transfer arrangement, the or each such arrangement comprising a transfer mechanism and a transfer shaft having a first end connected to said transfer mechanism; and
 a second-side mechanism comprising a second-side shaft; wherein said chamber is fluidly coupled to said transfer mechanism for transfer of rotary motion therebetween, and wherein:
 a) said chamber is connected to one of the gear elements (i), (iii) and (iv);
 b) said transfer shaft is connected to one of the gear elements (i) to (iv); and
 c) said second-side shaft is connected to one of the gear elements (i), (iii) and (iv);
 such that each of said gear elements is only coupled to one of said chamber, said transfer shaft and said second-side shaft.

The arrangement is such that one of the first-side and second-side shafts is set as input to thereby constitute an input shaft, and the other is set as output to thereby constitute an output shaft. The input shaft is adapted to be connected to a driving source adapted to provide it with an input rotary motion, and the output shaft is adapted to output rotary motion.

The fluid coupling between the chamber and the transfer mechanism may be such that provides a transfer ratio $D_{trans.}$ therebetween, i.e. for N revolutions of the chamber, the transfer mechanism will perform $D_{trans.} \times N$ revolutions. The transfer ratio $D_{trans.}$ may be dependent on the load exerted on the output shaft.

The arrangement may be such that the chamber is free to perform rotary motion under constant power provided by said driving motor, while the change in the transfer ratio $D_{trans.}$ is continuous (i.e. not discrete). In other words, while the number of revolutions of the chamber remains substantially constant, the number of revolutions of said transfer shaft, and consequently of said output shaft may change continuously. For example, upon a change in load on the output shaft, the chamber is still free to rotate at the same RPM, while the output shaft performs an increased/decreased number of revolutions depending on increase/decrease of the load on the output shaft respectively.

Upon increase of the load exerted on the output shaft, the transfer ratio d will decrease, causing the transfer shaft to revolve slower than the chamber. This decrease in the transfer ratio will cause the corresponding gear element attached to transfer shaft to 'lag behind' the gear element attached to the chamber, thereby leading to compensation in rotary motion of the output shaft. In other words, there is created a residual compensation factor CF, corresponding to the load exerted on the output shaft. While the chamber continues revolving at a constant RPM, the output shaft increases/decreases its RPM according to the load exerted thereon.

Thus, said transmission system may be effectively used as a torque converter, having a predetermined input and almost any desired output.

The arrangement may be such that during a mode of operation in which the load on said output shaft is too high for the driving motor to overcome, the rotary motion of said chamber is limited only by its fluid coupling to said transfer mechanism. It should be appreciated, that in order to overcome the load exerted on the output shaft, either the power of the motor should be increased or the load on the output shaft itself be reduced.

It should be understood that the term 'fluid coupling' refers to any sort of coupling in which motion is transferred from one element to another via a fluid medium.

Said chamber may comprise a cavity adapted to receive therein a coupling fluid such as oil or other fluid of appropriate viscosity. Said chamber may also be designed such that rotary motion of the chamber entails circulation of the coupling fluid therein.

According to one example of the present invention, said chamber is in the form of a hollow body defining a cavity, said cavity further being formed on the inner side thereof with grooves adapted to facilitate circulation of the coupling fluid within the chamber. In this case, said transfer mechanism may be in the form of a member immersed within the coupling fluid. The transfer member may be designed such that circulation of the coupling fluid entails rotary motion thereof and vice versa. In particular, said transfer member may comprise at least one blade having a predetermined cross-sectional area facilitating rotation thereof under the effect of the circulated coupling fluid.

The arrangement may be such that upon the initial, slow rotation of said input shaft, the coupling fluid in said chamber permits substantially free rotation of the planetary gear about its rotary axis, thereby effectively decoupling said planet carrier from being rotated by said input shaft. Thereafter, upon the continued, more rapid rotation of said input shaft, the coupling fluid in said chamber is forced outwardly by centrifugal force such as to effectively impede rotation of the planetary gear about its rotary axis, whereby the planetary gear revolves around the sun gear, and the planet carrier rotates about its rotary axis, thereby effectively coupling said planetary gear carrier to said input shaft.

According to another example of the present invention, said chamber may be in the form of an impeller having a half-torus shape cut perpendicular to its central axis, said impeller comprising a plurality of impeller blades. The impeller blades may be designed such that upon rotation of the impeller about the central axis, the coupling fluid is circulated in a semi toroidal vortex manner. In this case, the transfer mechanism may be in the form of a rotor having a similar design to that of the impeller, also having a plurality of blades. The rotor and impeller are arranged facing each other to form a fluid coupling as known per se, such that the coupling fluid is ejected from the impeller blades towards the rotor blades and back again to perform a toroidal vortex motion.

The transmission system according to the above example may have an implication in the automotive industry, in particular, in automotive vehicles. As common in automotive vehicles, an additional stator mechanism may be employed in the fluid coupling as know per se. With respect to the stator mechanism, it should be appreciated that an additional planetary gear assembly may be used for the stator mechanism, the additional planetary gear assembly being used much the same way as the original planetary gear assembly, with the stator being equivalent to the output shaft.

It should be appreciated that there exists a variety of ways and combinations of connecting the gear elements to the first-side mechanism, transfer mechanism and second-side mechanism. Several examples of combinations will now be discussed in detail.

According to one example of the present invention, said chamber is connected to said ring gear, said transfer shaft is connected to said planet carrier and said output shaft is connected to said sun gear. According to this arrangement, rotary motion of the chamber entails rotary motion of the ring gear, which in turn, imparts rotary motion to the output shaft. In addition, since the rotary motion of the chamber imparts rotary motion of the transfer mechanism, rotary motion is also imparted to the planet carrier.

According to another example, said chamber may be connected to the planet carrier, said transfer shaft may be connected to the sun gear and said output shaft may be connected to said ring gear.

The transmission system is optionally used as a torque converter adapted to reduce input by a large scale, for example from 1:10 to 1:1000. Such a reduction ratio may be employed in a variety of fields, for example in slurry stirring. In general, ratio reduction systems and transmission tend to demonstrate a drop in efficiency upon an increase in the transmission ratio. In other words, when the ratio is increased from 1:10 to 1:1000, the efficiency drops drastically.

The design of the transmission system, due to the specific arrangement of the planetary gear, may allow the increase in ratio to be accompanied by a moderate efficiency drop in the operation of the transmission. In particular, the transmission system may operate at about 85% efficiency at a transmission ratio of 1:10, more particularly, the transmission system may operate at about 70% efficiency at a transmission ratio of 1:100, and even more particularly, the transmission system may operate at about 60% efficiency at a transmission ratio of 1:1000.

The transmission system described above may be capable of reducing fuel consumption in automatic transmissions for automotive vehicles, as compared to the present automatic transmission systems.

As will be described below, such a planetary gear assembly can be used for a wide variety of applications such as crane mechanisms, boring mechanisms, stirring mechanisms etc. The transmission system may be particularly useful in an automatic transmission system for automotive vehicles since it is capable of reducing fuel consumption as compared to the existing systems.

BRIEF DESCRIPTION OF THE DRAWINGS

In order to understand the invention and to see how it may be carried out in practice, embodiments will now be described, by way of non-limiting examples only, with reference to the accompanying drawings, in which:

FIGS. 6A to 6C are schematic longitudinal cross-sectional views of the different elements of the transmission system shown in FIG. 3, and the manner of their connection to the planetary gear assembly shown in FIG. 4;

DETAILED DESCRIPTION OF EMBODIMENTS

Schematic Representation

Figures 1A, 1B:
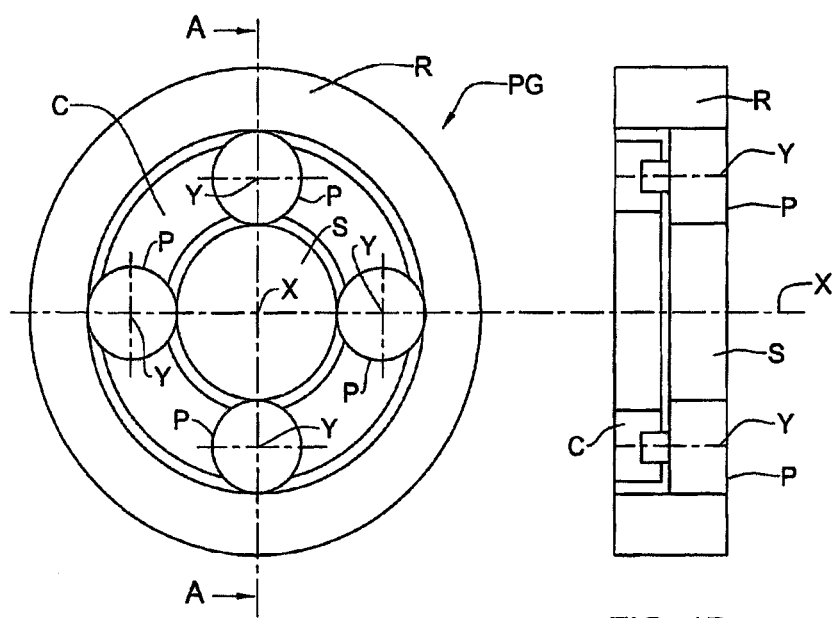
FIG. 1A is a schematic front view of a planetary gear used in the transmission system of the present invention.
FIG. 1B is a schematic cross-sectional view of the planetary gear shown in FIG. 1A, taken along line A-A.

With reference to FIGS. 2A to 2F, a transmission system generally designated 1 is schematically shown comprising a first-side mechanism 10, a transfer arrangement 20 and a second-side mechanism 30. The first-side mechanism 10 and the transfer arrangement 20 are fluidly coupled together to form a fluid coupling mechanism 2.

The first-side mechanism 10 is connected to an input shaft 11 for receiving rotary input therefrom, the transmission mechanism 20 is connected to a transfer shaft 21 for transferring part of the above rotary input thereto, and the second-side mechanism is connected to an output shaft 31 for providing desired rotary output to a required device (not shown).

Figure 2A:
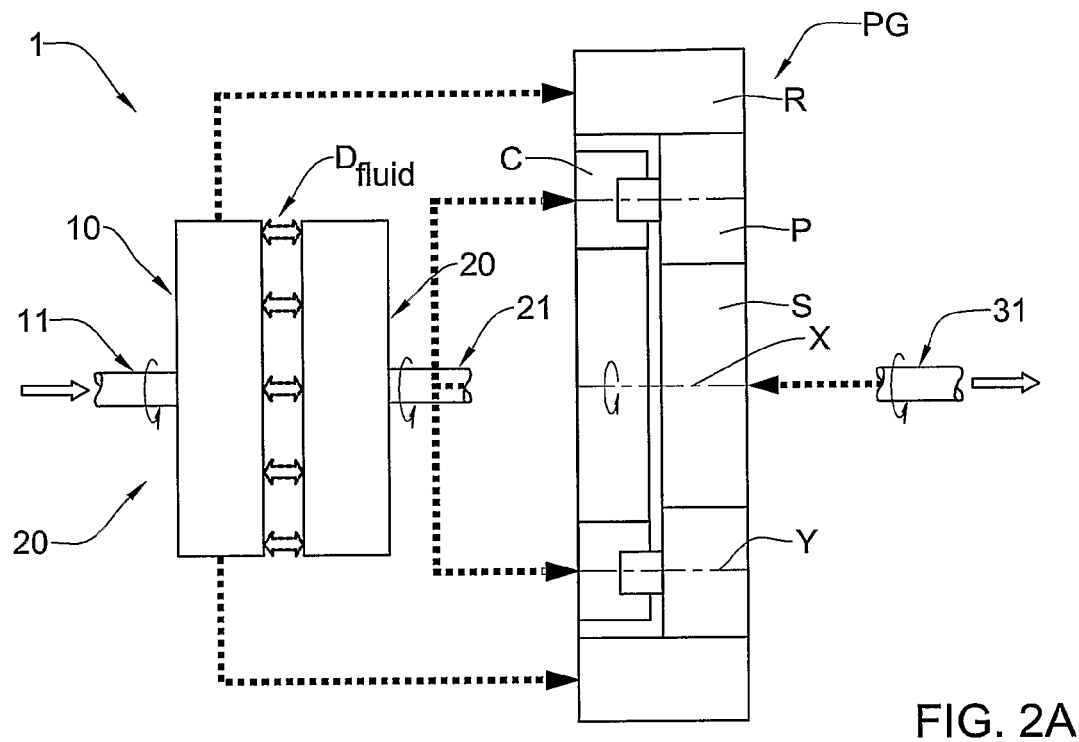
FIGS. 2A to 2F are schematic cross-sectional views of various configurations of the planetary gear shown in FIGS. 1A and 1B, incorporated in the transmission system according to the present invention.
Figure 2B:
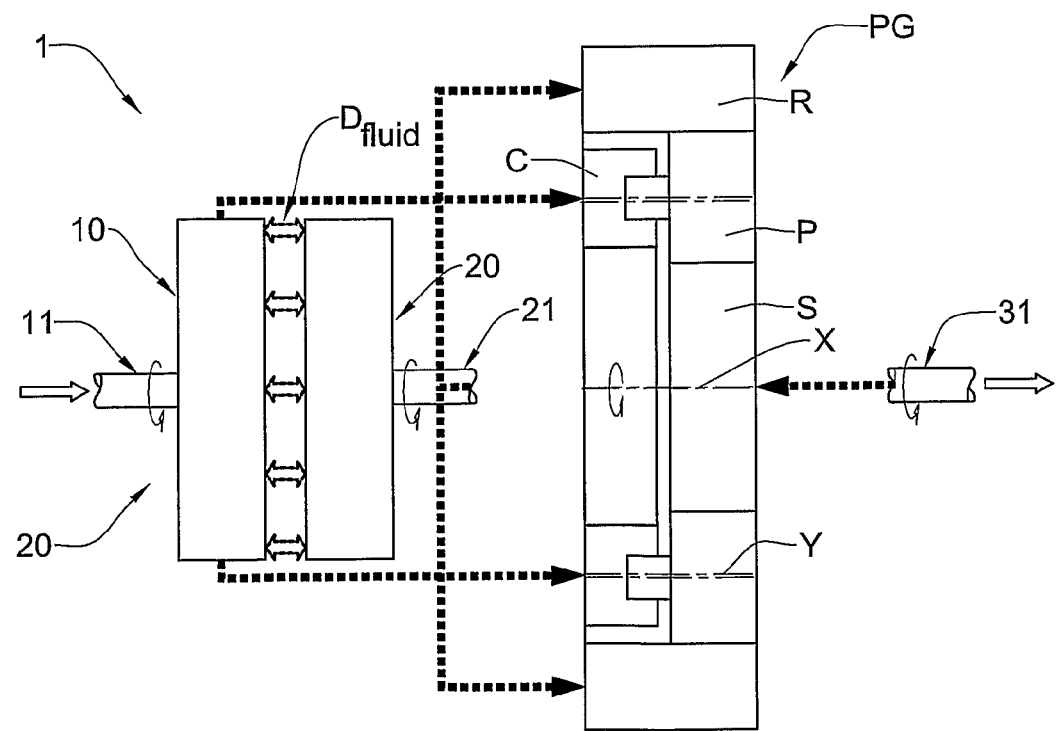
Figure 2C:
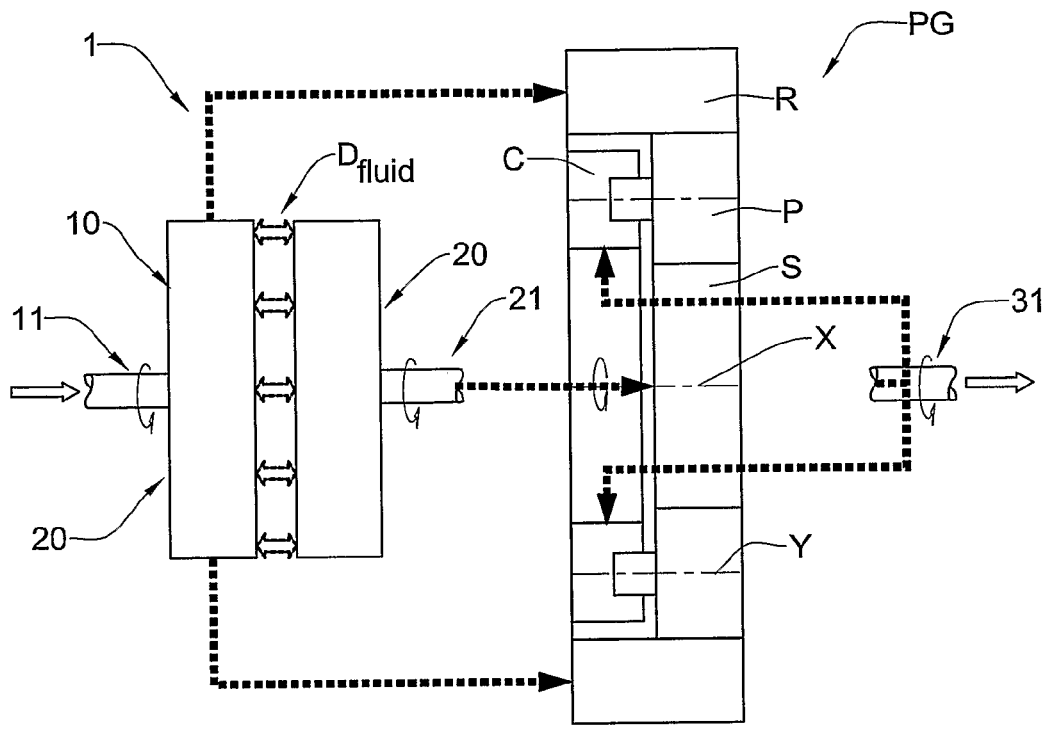
Figure 2D:
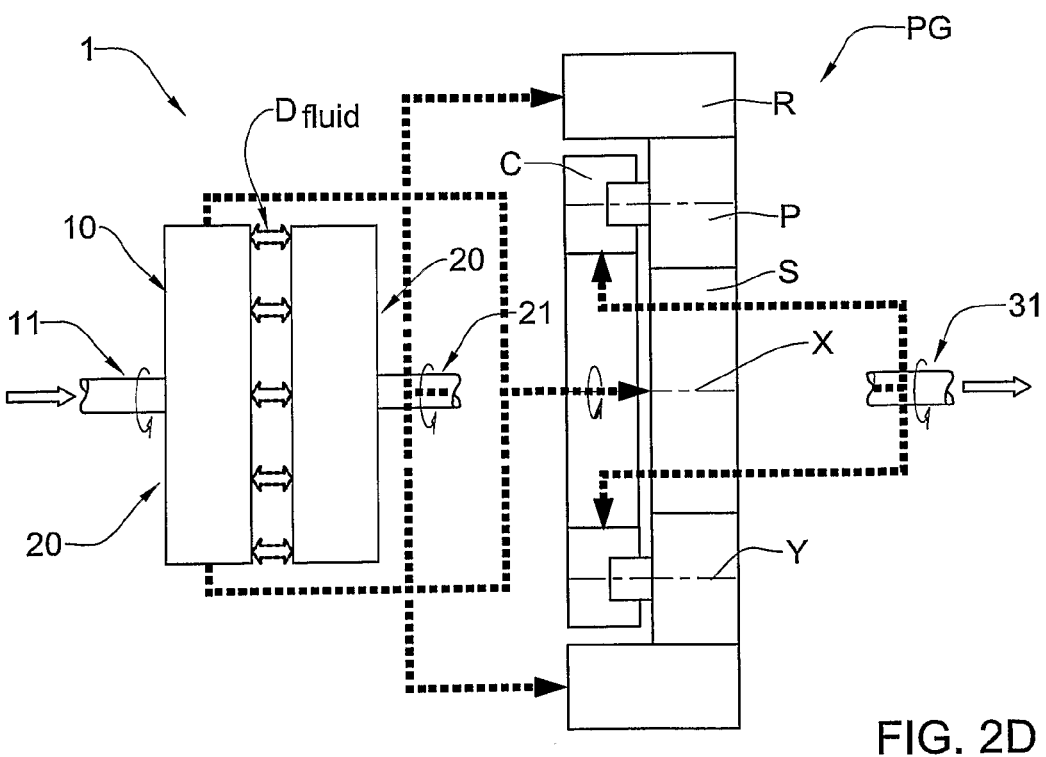
Figure 2E:
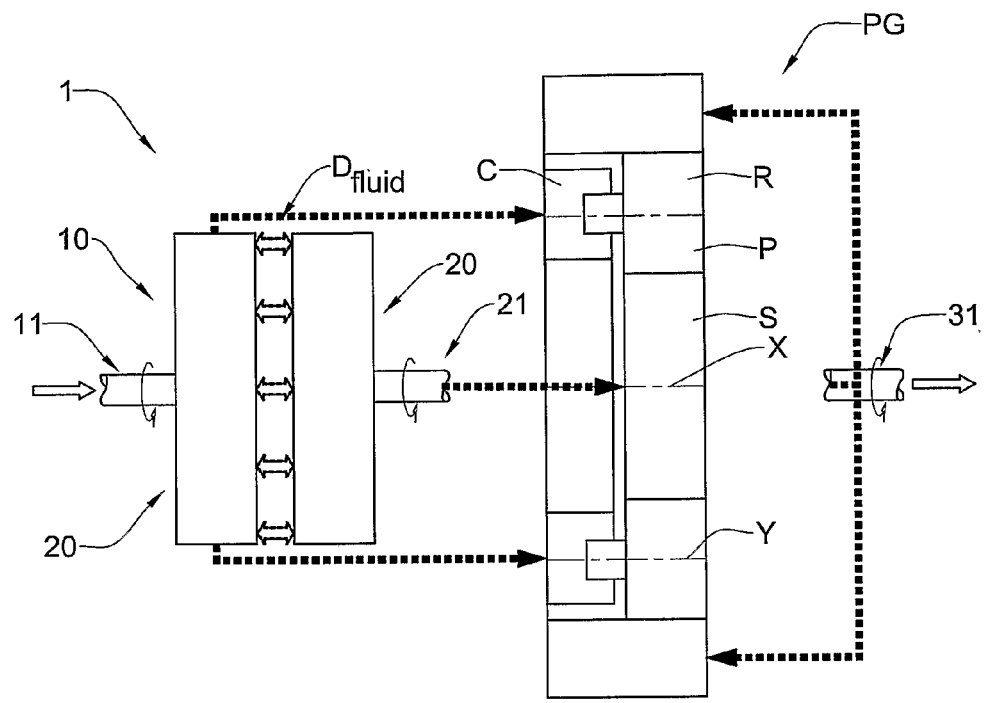
Figure 2F:
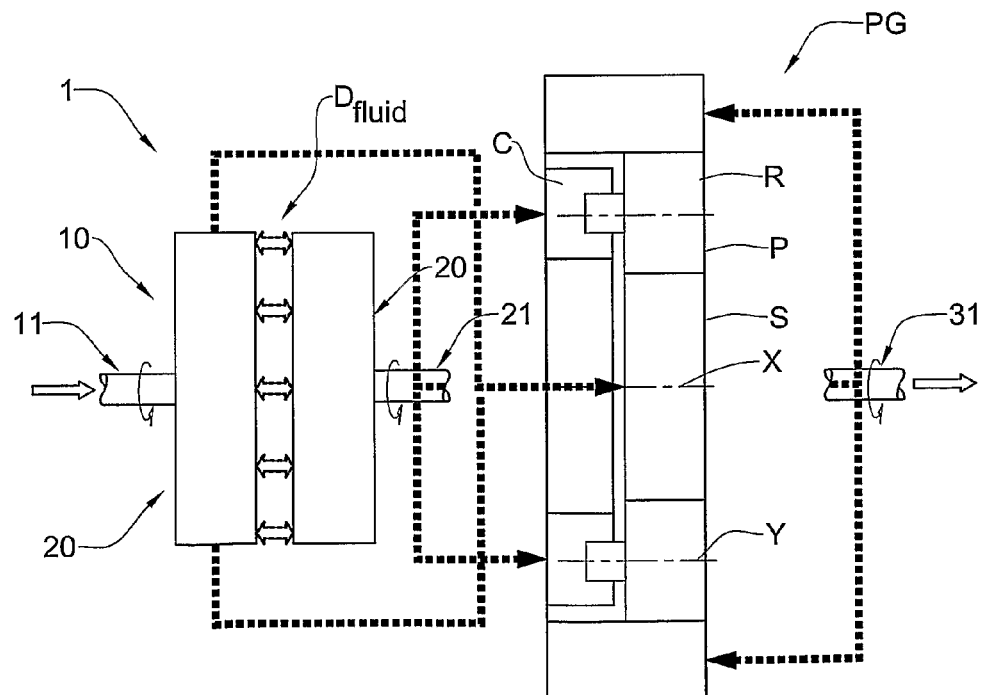

With particular reference to FIG. 2E, the first-side mechanism 10 is articulated to the planet carrier C as well as being fluidly connected to the transfer mechanism 20, the transfer shaft 21 of the transfer mechanism 20 is articulated to the sun gear S, and the output shaft 31 is articulated to the ring gear R.

With reference to the above, operation of the transmission system 1 will now be described for better understanding of the mechanism:

General Operational Mode

In operation, rotary input is provided by the motor (not shown) to the input shaft 11, entailing corresponding rotary motion of the first-side mechanism 10 of the fluid coupling mechanism 2 about the central axis X. Due to the fluid connection between the first-side mechanism and the transfer arrangement 10, 20, the transfer arrangement 20 is also set in rotary motion. Simultaneously, the planet carrier C acquires rotary motion from the first-side mechanism 10 due to its connection thereto.

Rotary input is transmitted from the first-side mechanism 10 to the transfer arrangement 20 at a certain transmission ratio $D_{trans.}$ due to the load applied to the output shaft 31. In particular, the load on the output shaft 31 causes losses within the fluid coupling mechanism 2, thereby effectively determining the transmission ratio. As a result, the transfer arrangement 20 is caused to revolve slower than the first-side mechanism 10, i.e. slower than the rotary input. In this case, the planet carrier C revolves at a revolution speed of $V_{input}$ due to its connection to the first-side mechanism 10, while the transfer shaft 21, and consequently the sun gear S, revolve at a slower revolution speed of $V_{transfer} < V_{input}$) wherein: $V_{input} - V_{transfer} = V_{residual}$ Thus, the ring gear S, and consequently the output shaft 31, are set in rotary motion having an output revolution speed $V_{output}$ being a combination of the revolution speed of both the planet carrier C and the sun gear S. Calculation of the output revolution speed $V_{output}$, as most planetary gear calculations practiced to date, may be achieved by superposition as described in the steps below. All calculations are made with reference to the number of revolutions per minute:

Step 1—both planet carrier C and sun gear S revolve in a CW direction a number of revolutions corresponding to $V_{trans.}$. During this step, the ring gear R also performs a number of revolutions corresponding to $V_{trans.}$, i.e. a 1:1 ratio.

Step 2—the sun gear S is held stationary, and the planet carrier C revolves in a CW direction an additional number of revolutions corresponding to $V_{residual}$. During this step, the CW revolution of the planet carrier C causes the ring gear R to perform a CCW rotary motion with a number of revolutions $V_{ring}$. The ratio between the revolution of the sun gear S and ring gear R may be defined as $$D_{internal} = \frac{V_{residual}}{V_{ring}},$$

and is a constant value dependent on the number of gear teeth of the ring gear R and each of the planet gears P.

In light of the above, it is clear that for every rotary input from the input shaft 11, there is a residual compensation factor CF, corresponding to the load exerted on the output shaft 31. In other words, the greater the load exerted on the output shaft 11, the lower the transfer ratio $D_{trans.}$ and consequently the greater the compensation factor CF. Such an arrangement provides the input shaft 11 the ability to provide a constant rotary input, while the transmission adjusts itself to output the required rotary motion according to the load exerted on the output shaft 31.

This demonstrates that in the end result, the ring gear R, and consequently the output shaft 31 connected thereto, perform a smaller number of revolutions per minute ($V_{output}$) than that of the input $V_{input}$, thus $D_{in/out} < 1$.

Ideal Operational Mode

This mode of operation is a specific case in which the transfer ratio $D_{trans.} = 1$. In such a case, there is a full transfer of rotary motion from the first-side mechanism 10 to the transfer arrangement 20, i.e. both revolve at a revolution speed $V_{input}$, and have the same number of revolutions per minute. In this case, the planet carrier C rotated by the first-side mechanism 10, and the sun gear S rotated by the transfer arrangement 20 consequently revolve at the same speed. Thus, the ring gear R, and consequently the output shaft 31, is forced to revolve at the same RPM as that of the input shaft 11, yielding an overall transfer ration $$D_{in/out} = \frac{V_{input}}{V_{output}} = 1.$$

Such an operational mode may simulate a situation of zero load on the output shaft 31, i.e. the resistance of the output shaft 31 to rotary motion is zero.

Several embodiments of the transmission system will now be discussed. In the first embodiment, the reference numbers for each of the elements shown in the above Figures has been multiplied by 100 (10→100, 20→200 etc.).

First Embodiment

Figure 3A:
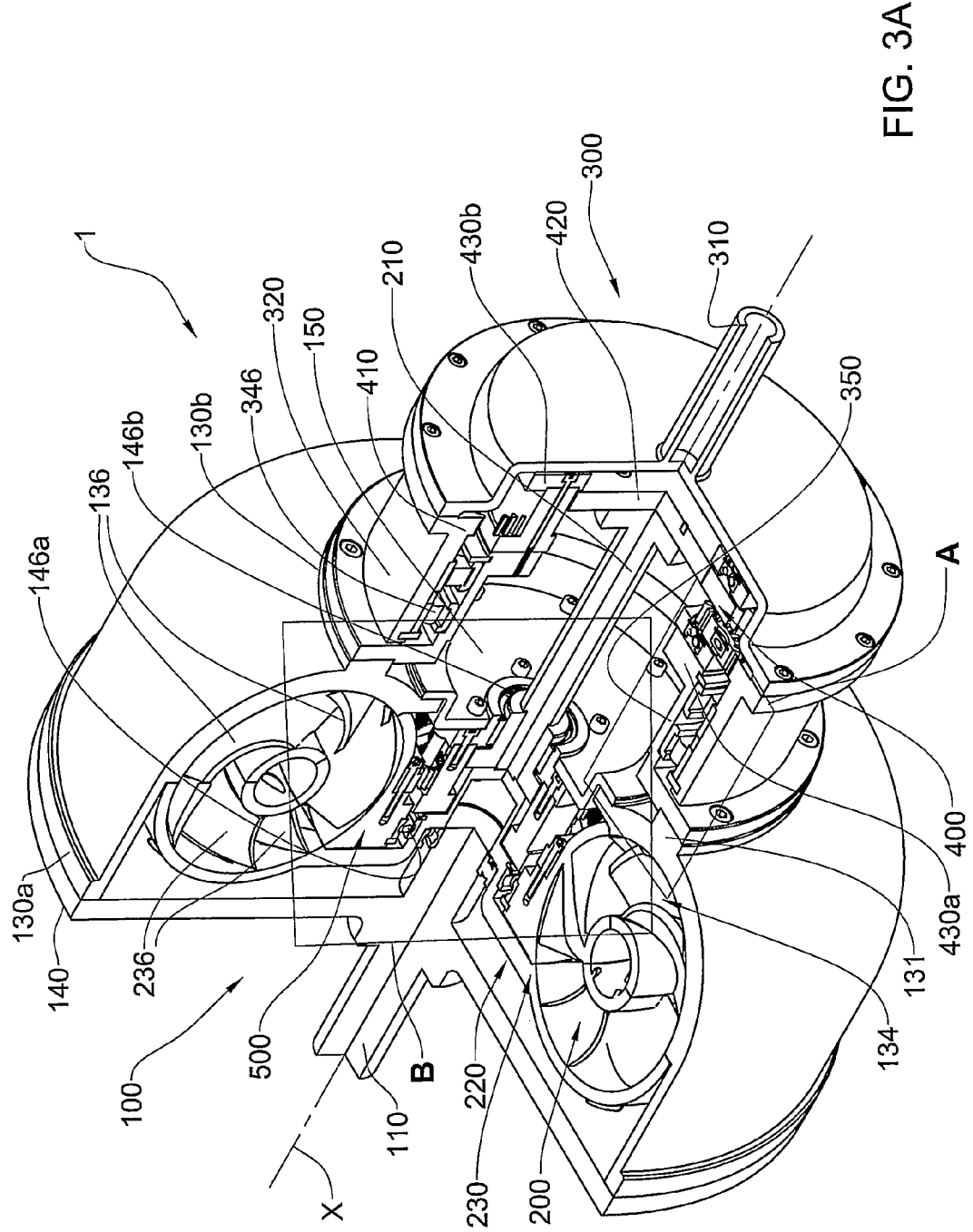
FIG. 3A is a schematic cut-away cross-sectional view of a transmission system according to one embodiment of the present invention.
Figure 3B:
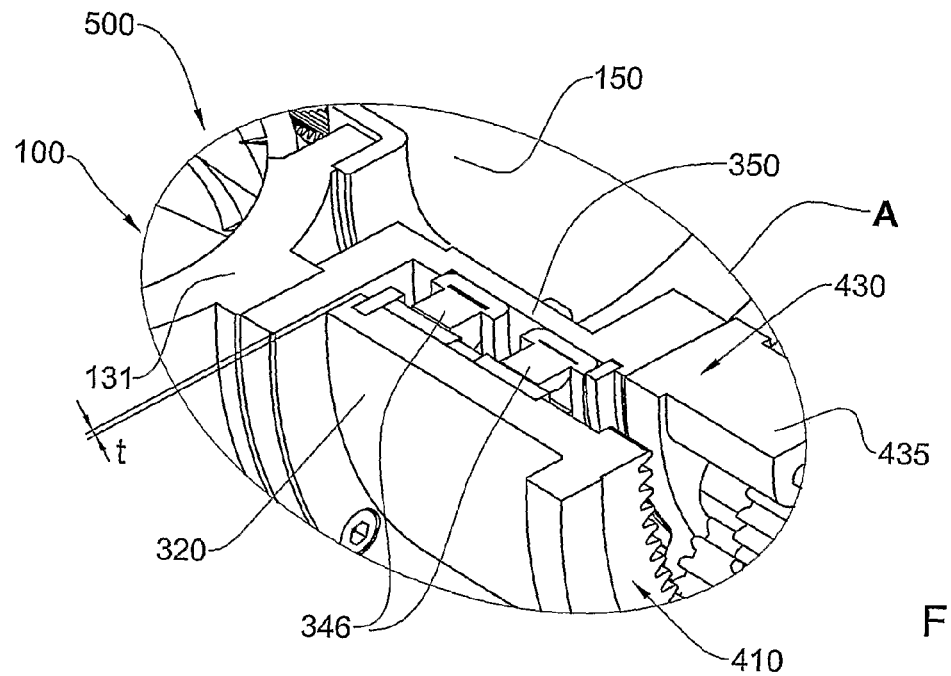
FIG. 3B is an enlarged view of detail A of FIG. 3A.
Figure 3C:
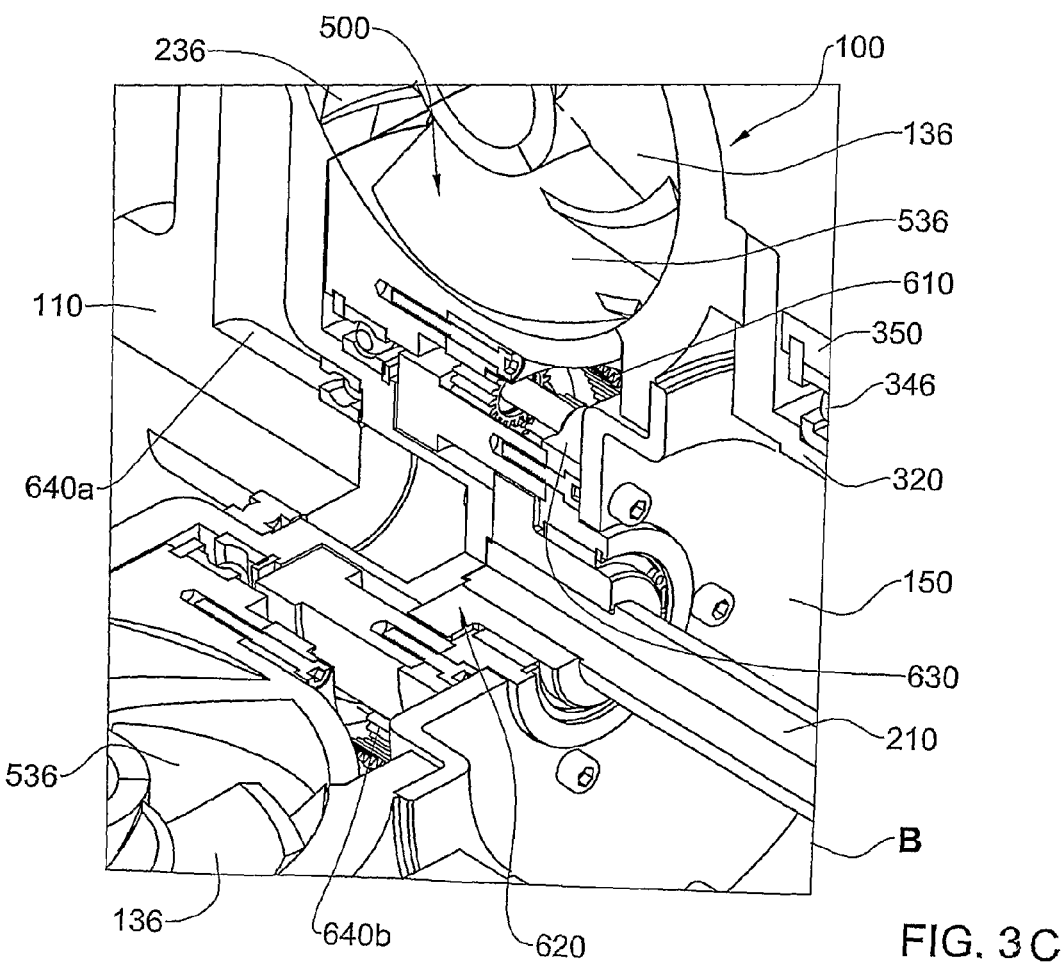
FIG. 3C is an enlarged view of a detail B of FIG. 3A.

Turning now to FIG. 3, a cross section of a transmission system, generally designated 1 is shown comprising first-side mechanism 100, a transfer arrangement 200, a second-side mechanism 300, and a planetary gear assembly 400.

The first-side mechanism 100 is adapted to receive rotary motion from a drive source such as a motor (not shown) as input, and the second-side mechanism 300 is adapted for outputting rotary motion under the arrangement of the transmission system 1. Therefore, it should be understood that with respect to the present embodiment the terms 'first-side' and 'input', and the terms 'second-side' and 'output' are used interchangeably. However, it should also be understood that such an arrangement is not compulsory, i.e. the first-side mechanism 100 may be used for output while the second-side mechanism 300 is used for input.

The planetary gear assembly 400 comprises a ring gear 410, a sun gear 420 and a planet carrier assembly 430 comprising an arrangement of planet gears 440. The sun gear 420 is adapted to mesh with the planet gears 440, which in turn are adapted to mesh with the ring gear 410 as known per se.

In assembly, the input mechanism 100 is fluidly coupled to the transfer arrangement 200 as known per se, forming together a fluid coupling mechanism. In addition, each of the input mechanism 100, transfer arrangement 200 and output mechanism 300 is articulated to one of the gear elements (410, 420, 430, 440) of the planetary gear assembly 400. In particular, the input mechanism 100 is articulated to the planet carrier 430, the transfer arrangement 200 is articulated to the sun gear 420 and the output mechanism 300 is articulated to the ring gear 410.

The structure and manner of operation of the first-side mechanism 100, transfer arrangement 200, second-side mechanism 300 and planetary gear assembly 400 will now be described in detail. In addition, the transmission system 1 may further comprise a stator mechanism 500 which will be discussed in detail later.

Structure of the Planetary Gear Assembly

Figure 4:
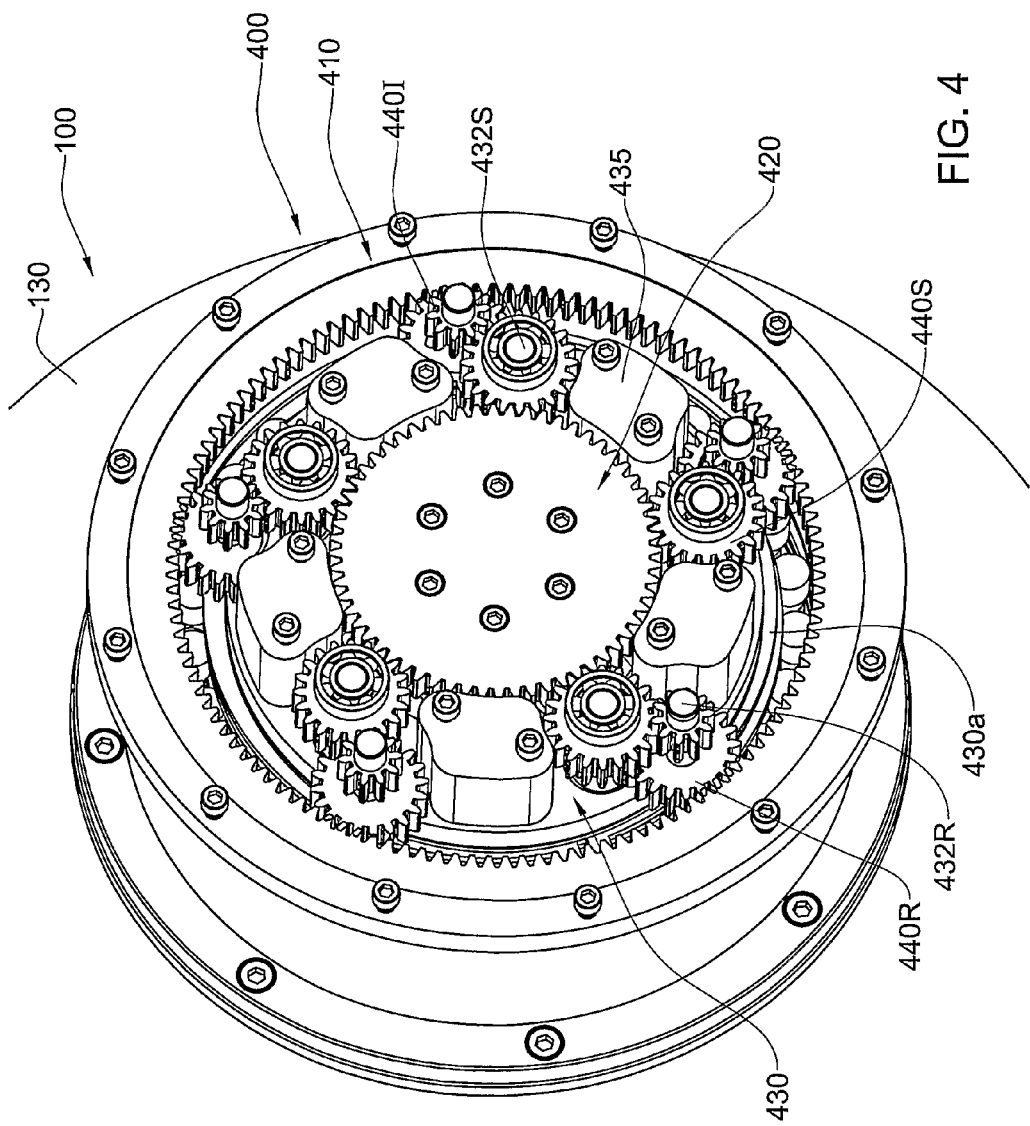
FIG. 4 is a schematic isometric view of the planetary gear assembly used in the transmission system shown in FIG. 3.

With reference to FIG. 4, the planetary gear assembly 400 is a two level assembly, i.e. has two levels of planet gears 440 with a transmission ratio therebetween. More particularly, the planetary gear assembly 400 comprises a first planet carrier 430a and a second planet carrier 430b spaced therefrom by support members 435. Between the first and second planet carrier 430a, 430b, there extend a set of sun rods 432S and a set of ring rids 432R, each rod of each set being adapted for mounting thereon at least one planetary gear 440.

In the set of sun rods 432S, each sun rod has mounted thereon a first planet gear 440S, spaced from the first planet carrier 430a and adjacent the second planet carrier 430b. In the set of ring rods 432R, each rod serves a mutual axis for a second planet gear 440R of a first diameter mounted thereon adjacent the first planet carrier 430a and an idle planet gear 440I of a second, larger diameter mounted thereon spaced from the first planet carrier 430a and adjacent the second plant carrier 430b (shown FIG. 3A).

The arrangement is such that the first planet gears 440S mesh both with the sun gear 420 and with the idle planet gears 440I, and the second planet gears 440R mesh with the ring gear 410.

An arrangement as described above provides the planetary gear assembly 400 with a specific transfer ratio between the planet carriers 430 and the ring gear 420. This ratio will be referred to as $D_c$, and is determined by the number of teeth of the planet gears 440S, 440R and 440I as well as that of the sun gear 420 and ring gear 410.

Structure of the Input Mechanism

Figure 5A:
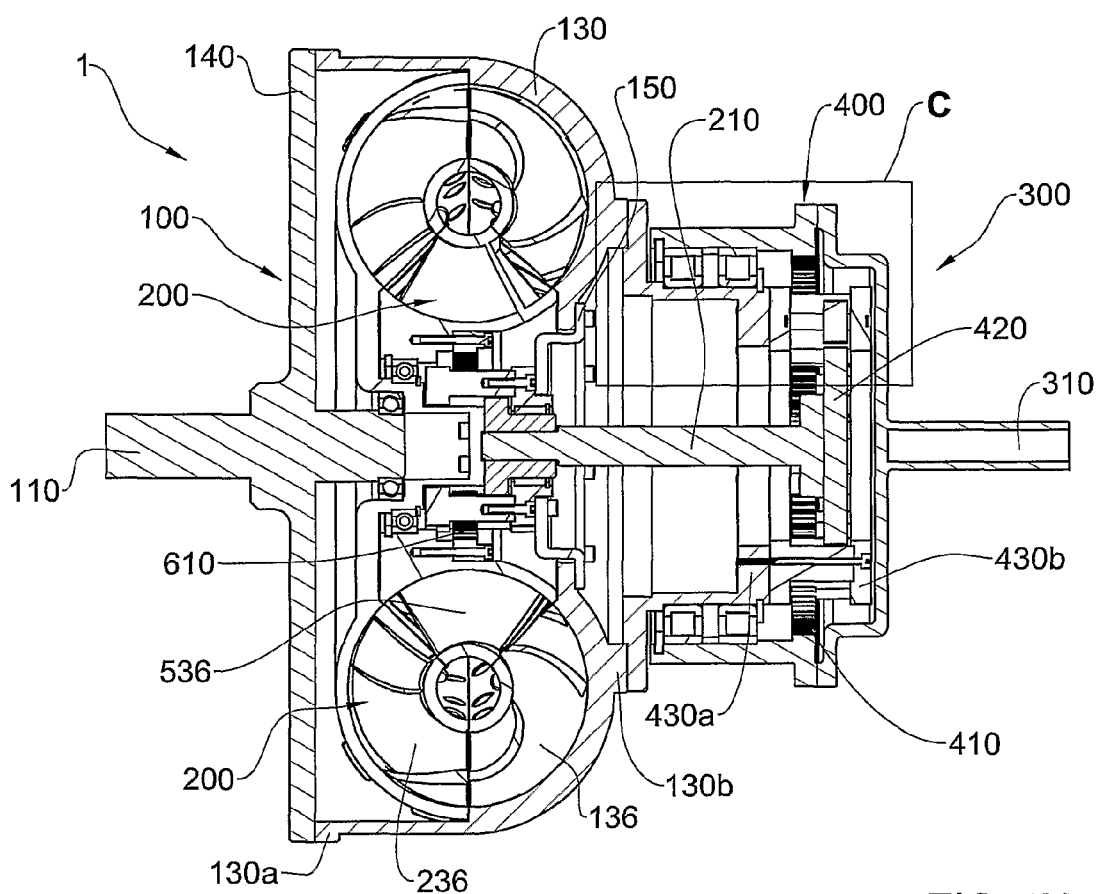
FIG. 5A is a schematic longitudinal cross-sectional view of the transmission system shown in FIG. 3.
Figure 5B:
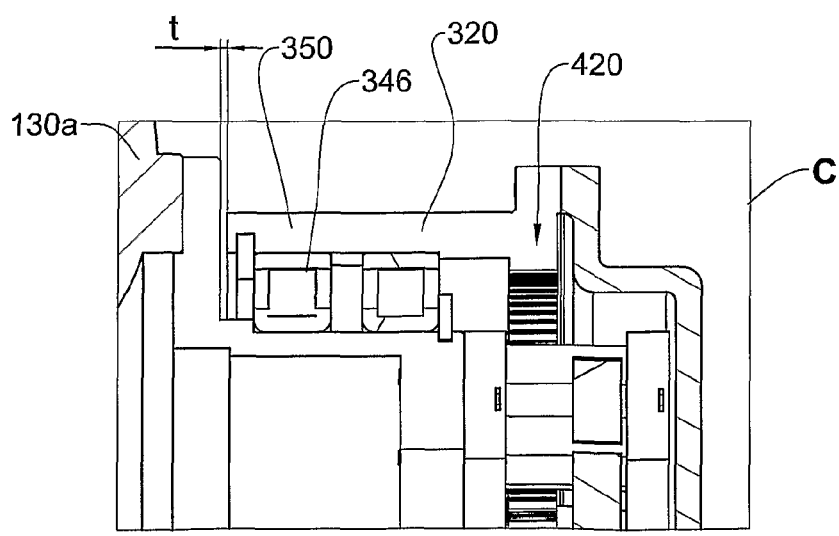
FIG. 5B is an enlarged view of a detail C of FIG. 5A.
Figure 6A:
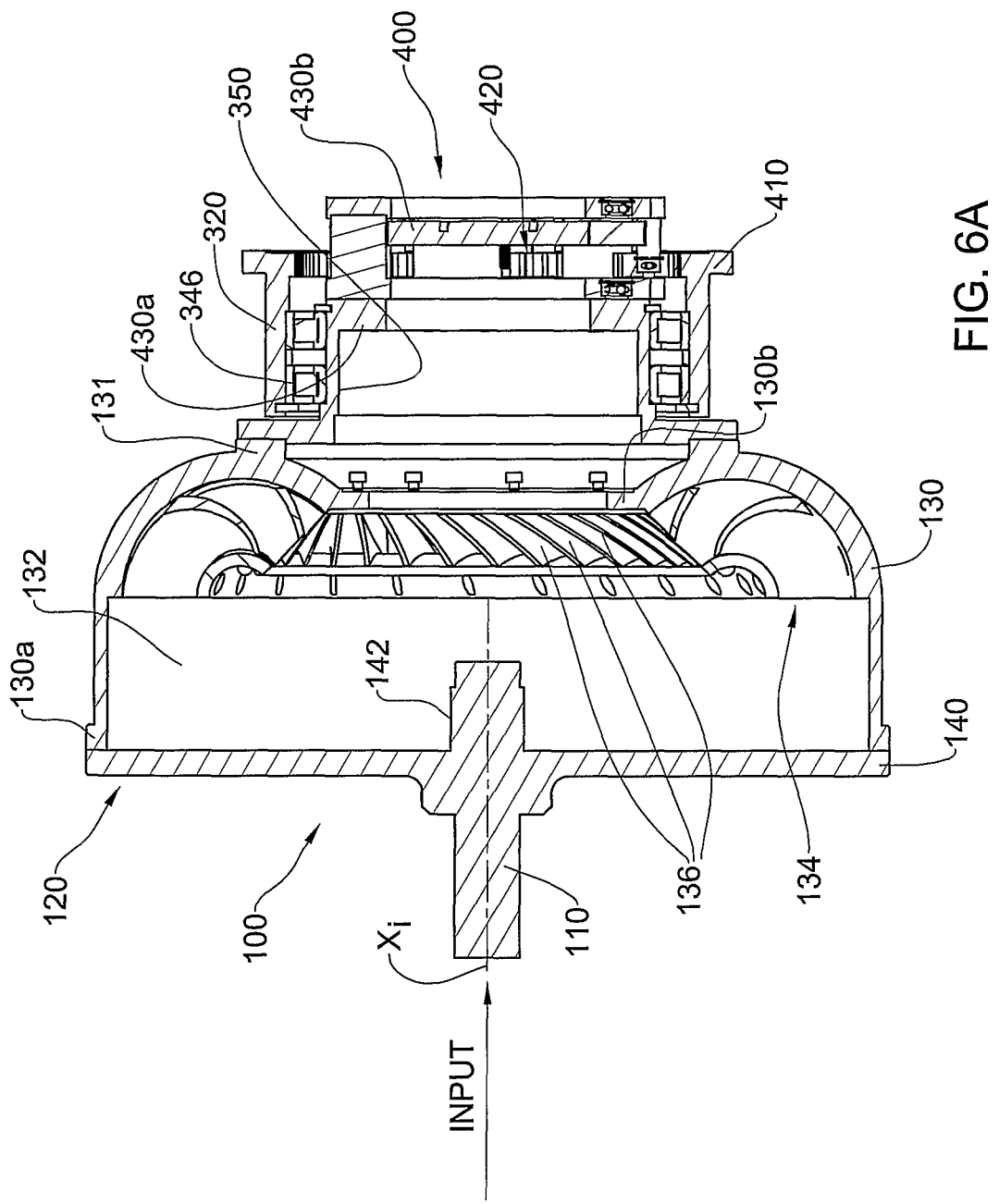

Turning now to FIGS. 3A, 5a and 6A, the input mechanism 100 comprises an input shaft 110 and an input chamber 120 attached to one another to facilitate transfer of rotary motion from one to another. The input chamber 120 comprises an essentially hollow bell-like body 130 having a central axis $X_i$, a first end cover 140 and a second end cove 150 to form a fluid compartment 132. The fluid compartment 132 is adapted to be at least partially filled with fluid or granular material such as oil, sand etc. as will be explained later.

The bell-like body 130 is formed, within the fluid compartment 132 with an impeller arrangement 134 at an end opposite the first end cover 140. The impeller arrangement 134 is in the form of a torus cut into half perpendicular to its central axis, and has a plurality of impeller blades 136.

The first end cover 140 is integrally formed with the input shaft 110, such that it axially protrudes from one side thereof, and a central axle 142 axially protruding from the other side thereof. The first end cover 140 is rigidly attached to a first end rim 130a of the bell-like body 130 such that the central axle 142 extends into the fluid compartment 132.

The second end cover 150 is formed with a central hole 152 adapted to receive therethrough a transfer shaft 210 of the transfer mechanism 200. The second end cover 150 is rigidly attached to a second end rim 130b of the bell-like body 130.

Structure of the Transfer Mechanism

Figure 6B:
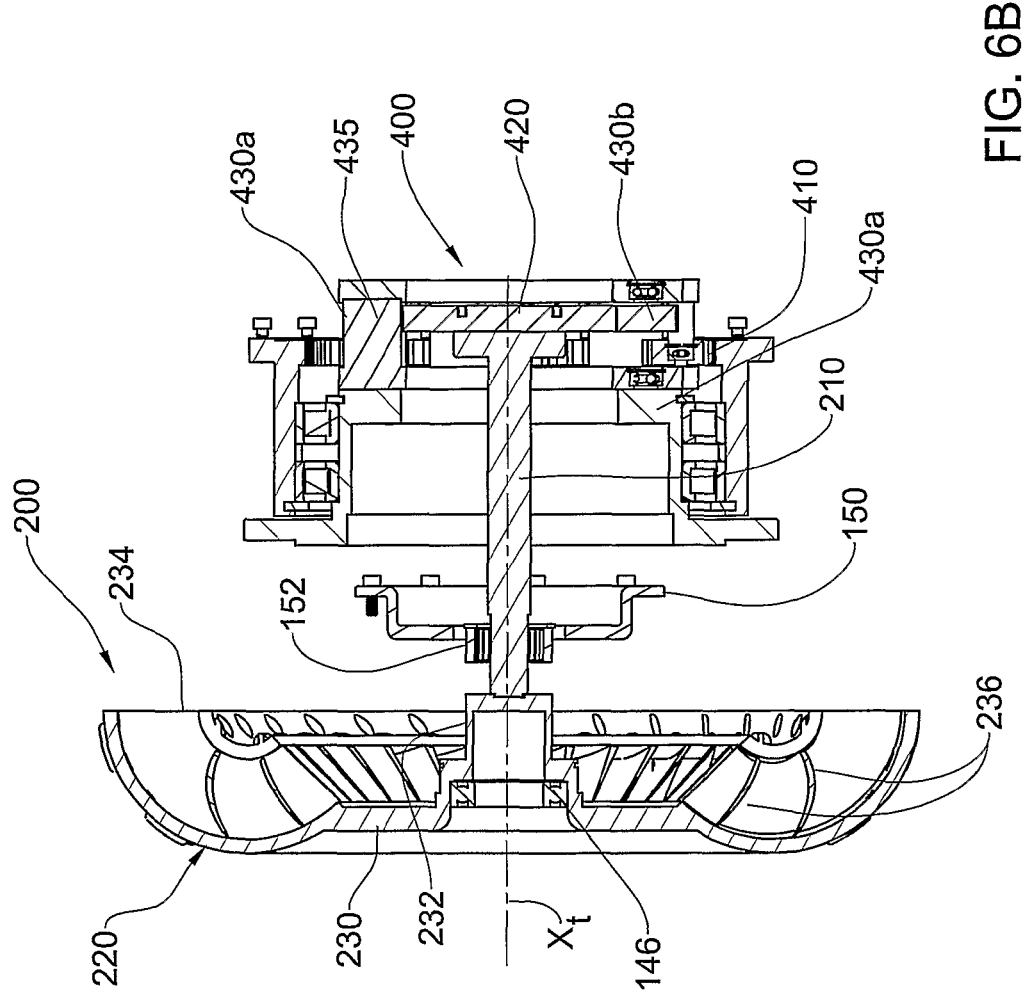

With further reference to FIG. 6B, The transfer mechanism 200 comprises a turbine 220 having a central axis $X_t$, and a transfer shaft 210 attached thereto. The turbine 220 in turn, comprises a turbine body 230 having a mounting portion 232 and a rotor arrangement 234 which are integrally formed. The rotor arrangement 234 of the turbine 220 is in the form a torus cut into half perpendicular to its central axis, and comprises a plurality of rotor blades 236.

In assembly, the transfer mechanism 200 is housed within the fluid compartment 132 such that the central axis $X_t$ of the transfer mechanism is co-aligned with the central axis $X_i$ of the input mechanism 100, and the transfer shaft 210 protrudes from the central hole 152 of the second end cover 150. In this position, the impeller arrangement 134 of the input mechanism 100 faces the rotor arrangement of the transfer mechanism 200.

The transfer mechanism 200 is mounted on the central axle 142 using bearings 146a, 146b in order to allow the turbine 220 and consequently the transfer shaft 210 to freely revolve about the central axis $X_t$. Thus, in the presence of a sufficient amount of fluid present within the fluid compartment, rotary motion of the impeller arrangement 134 entails rotary motion of the rotor arrangement 234 as known per se from fluid couplings.

Structure of the Output Mechanism

The output mechanism 300 comprises an output shaft 310 and a sleeve 320 attached to one another to facilitate transfer of rotary motion from one to another. The sleeve 320 comprises an essentially hollow sleeve body 330 having a central axis $X_o$, and a cover 340. The sleeve 320 is adapted to house therein the planetary gear assembly 400 as will be explained in detail later.

The cover 340 is integrally formed with the output shaft 310, such that it axially protrudes from one side thereof. The cover 340 is rigidly attached to a first end rim 330a of the sleeve body 330.

In assembly, a support sleeve 350 is attached to a heightened rim 131 of the bell-like body 130 such that it extends axially along the central axes $X_i$, $X_t$, and the sleeve 320 is mounted thereon using bearings 346, in order to allow the sleeve body 330 and consequently the output shaft 310 to freely revolve about the central axis $X_o$. It is noticed that there is an interval t between the sleeve body 330 and the support sleeve 350 such that the sleeve body 320 does not contact the bell-like body 130 of the input chamber 120. This provides that the sleeve body 320 only receives rotary input from the planetary gear assembly 400.

In the transfer shaft 210 is attached to the sun gear 420, one end of the support sleeve 350 is formed as the planet carrier 430a and the inner side of the sleeve body 330 is formed with gear teeth, thus constituting the ring gear 410. However, it is to be understood that the sleeve body 330 and the support sleeve 350 may also be rigidly attached to a ring/sun gear of an existing planetary gear assembly.

Operation of the Transmission System

Figures 7A, 7B:
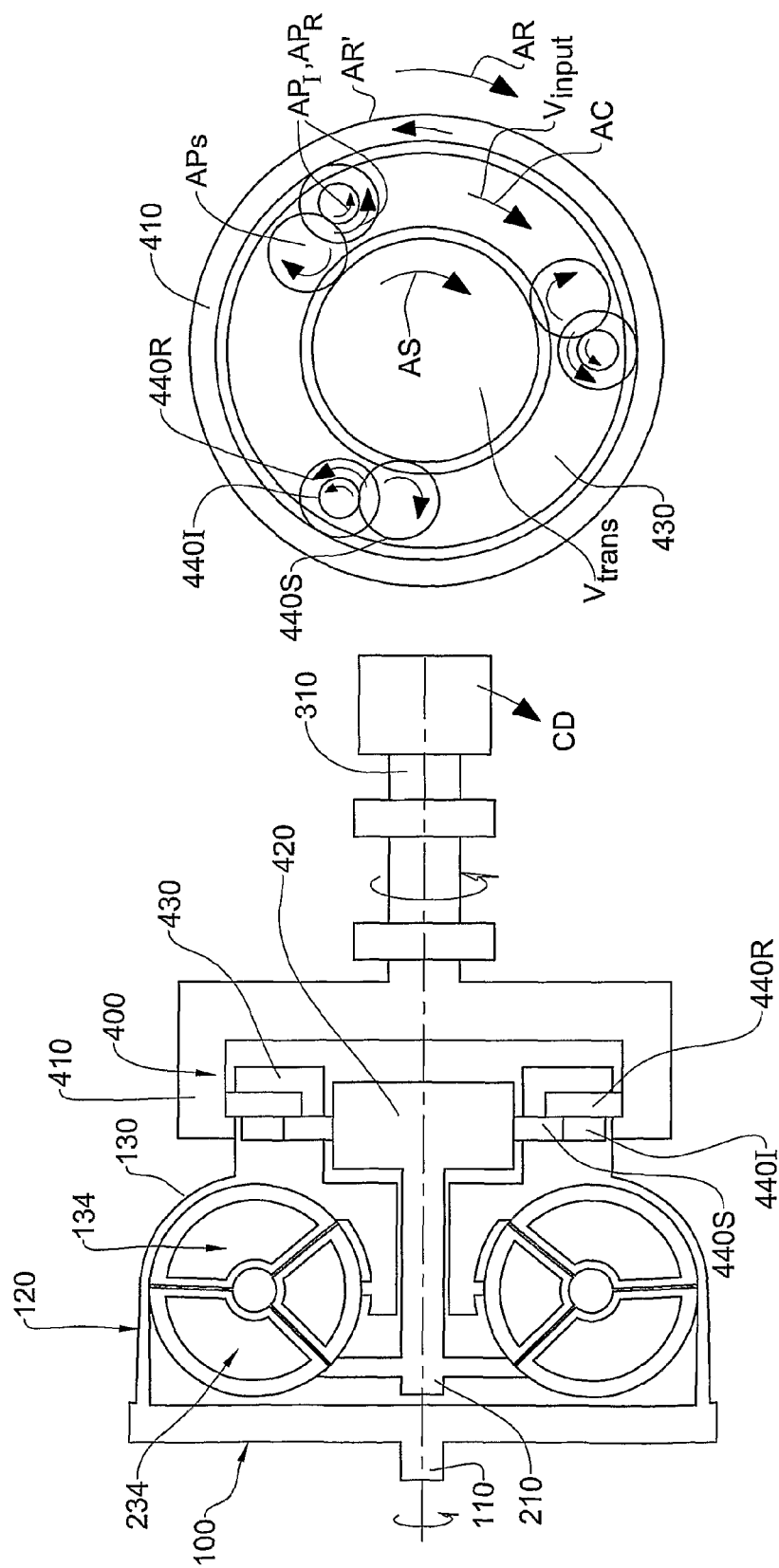
FIG. 7A is a schematic simplified view of the transmission system shown in FIG. 5.
FIG. 7B is a schematic simplified front view of the planetary gear assembly shown in FIG. 4.

Operation of the transmission system 1 will now be described with respect to the simplified schematic view shown in FIGS. 7A and 7B.

In operation, the input shaft 110 is attached to a motor (not shown) providing a desired rotary input. Rotation of the input shaft 110 entails rotation of the input chamber 120, and consequently rotation of the following:

i. the impeller arrangement 134; and
ii. the support sleeve 350.

Upon rotation of the impeller arrangement 134, the fluid, in this case oil, begins performing a circular motion under the effect of the impeller blades 136, and is discharged towards the rotor blades 236 of the rotor arrangement 234 of the transfer mechanism 200. Impact of the oil on the rotor blades 236 sets the rotor arrangement 234 to in rotary motion. This, in turn, entails rotation of the sun gear 420 of the planetary gear assembly 400.

It is noted that while the bell-like body 130 revolves at an RPM of $V_{input}$, there is a transfer ratio $D_{trans.}$ between the rotor arrangement 234 and the impeller arrangement 134 such that the rotor arrangement 234 revolves at a speed of $V_{trans}<V_{input}$. This is mainly due to energy losses resulting from the fluid coupling mechanism, affected mostly by the load exerted on the output shaft 310. In other words, the greater the load on the output shaft 310, the lower the transfer ratio $D_{trans.}$. It should also be noted that this feature serves an essential purpose in the formation of the transmission system 1 as will be referred to later on.

Simultaneously, rotation of the support sleeve 350 entails rotation of the first planet carriers 430a, 430b, being rigidly attached to one another.

It is noted that both the sun gear 420 and the planet carriers 430a, 430b, are set in rotary motion in the same direction, CW or CCW corresponding to the direction of rotation of the input shaft 110. The direction of revolution of the ring gear 410, sun gear 420, planet carrier 430, and planets 440S, 440R and 440I are denoted by arrows AR, AS, AC, $AP_S$, $AP_R$ and $AP_I$ respectively.

Since the planetary gear assembly 400 is a two-level assembly as previously described, one set of planetary gears 440S meshes with the sun gear 420, and another set of planet gears 440R meshed with the ring gear 410. The third set of planet gears 440I is used as an idler to allow transfer of rotary motion between the two sets 440S, 440R to create a desired transfer ratio therebetwen.

Resulting from the above, the ring gear 410 acquires rotary motion being a combination of the rotary motion of the sun gear 420 receiving input from the transfer shaft 210 and rotary motion of the planet carrier receiving input from the input shaft 110.

Gear Changing in the Transmission System

In order to better demonstrate the changing of gears in the transmission system 1, the following initial operational mode will be assumed:

i. the motor provides the input shaft 110 with an initial revolution speed of $V_i$;
ii. the transfer ratio $D_{trans.}=1$; and
iii. the output shaft 310 is under a load L.

Initially, upon rotation of the input shaft 110, the transfer shaft 210 acquires a revolution speed $V_t=V_i$, and provides $V_i$ to the sun gear 420. Simultaneously, the input chamber provides the planet carrier 430 with a revolution speed of $V_i$. As a result, the planet carrier 430 revolves faster than the sun gear 420, whereby revolution of the ring gear 410 is yielded, having an output revolution speed Vi. This is similar to the ideal, mode of operation previously described.

Thereafter, the load on the output shaft is increased. Thus, the load on the transfer shaft 210 is increased, causing a greater resistance of the rotor arrangement 234 to rotary motion, i.e. it becomes harder for the impeller arrangement 134 to rotate the rotor arrangement 234. This causes the transfer ratio $D_{trans.}$ to drop, for example to 0.95. In this case, the planet carrier 430 still revolves at $V_i$ while the sun gear 420 revolves at $V_t = 0.95V_i$. This causes the sun gear 420 to 'lag behind' the planet carrier 430, providing a compensation factor CF determined by the specific parameters of the planetary gear assembly 400. In this case, the revolution speed of the ring gear 410 and consequently of the output shaft 310 is determined by the combined revolution speeds of the planet carrier 430 and the sun gear 420. In any case, this revolution speed is lower than $V_i$.

It is thus clear, that while the motor operates at a constant input revolution speed, the revolution speed of the output shaft 310 changes in a continuous manner. The ratio $V_i$ to $V_o$ may be defined as $D_{i/o}$, and also changes in a continuous manner. The transfer ratio $D_{i/o}$ is dictated by $V_i$ and the design of the planetary gear assembly 400. In order to better understand the possible transmission ratios, a detailed example will now be discussed.

Specific Example of Operation

In the present example, the number of gear teeth of each element of the planetary gear assembly 400 is as follows:

TABLE 2

| Gear element | Number of gear teeth |
|---|---|
| Ring gear 410 | 240 |
| Sun gear 420 | 120 |
| First set of planets 440S | 40 |
| Second set of planets 440I | 8 |
| Thirds set of planets 440R | 48 |

In the present example, the motor causes the input shaft 110 to revolve at 1000 RPM in a CW direction. The planet carrier 430 is consequently forced to revolve at 1000 RPM, also in a CW direction. For sake of calculation, a transfer ratio $D_{trans.} = 0.9$ will be assumed. Thus, for every revolution of the input shaft 110, the transfer shaft performs 0.9 revolutions, and particularly in the present example, for every 1000 revolutions of the output shaft, the transfer shaft will perform 900 revolutions, i.e. $V_{trans.} = 900$ RPM.

In order to demonstrate the gear calculation, reference is made back to the calculation steps previously discussed in the section designate 'General operational mode':

Step 1—both planet carrier C and sun gear S revolve in a CW direction a number of revolutions corresponding to $V_{trans.} = 900$. During this step, the ring gear R also performs a number of revolutions corresponding to $V_{trans.}$, i.e. 900 revolutions in a CW direction.

Step 2—the sun gear S is held stationary, and the planet carrier C revolves in a CW direction an additional number of revolutions corresponding to $V_{residual} = 1000-100=100$. With regards to directions, revolution of the planet carrier 430 in a CW direction while the sun gear 420 is held fixed, entails a revolution of the ring gear 410 in a CCW directions as demonstrated by the arrows in FIG. 7B.

The calculation of step 2 is demonstrated below:

In the present example, for each revolution of the planet carrier 430, each first planet gear 440S revolves around the sun gear 420 once. Since the sun gear 420 comprises 120 gear teeth and each first planet gear 440S comprises 40 teeth, during each revolution about the sun gear 420, each first planet 440S performs three revolutions.

Each first planet gear 440S meshes with a corresponding idle planet gear 440I. The transfer ratio between the two is 40:8, i.e. 5:1. Hence, for each revolution of each first planet gear 440S, each of the idle planet gears 440I perform five revolutions. Referring to the above, for each revolution of the planet carrier 430, each idle planet gear will perform 15 revolutions.

Since the idle planet gears 440I and the second planet gears 440R are mounted on a mutual ring rod 432R, each second planet gear 440R will perform 15 revolutions.

The transfer ratio between the number of teeth of each second planet gear 440R and the number of teeth of the ring gear 410 is 48:240, i.e. 1:5. In other words, for each revolution of the planet carrier 430, the ring gear performs (48.15)/240=3 revolutions.

In combining steps 1 and 2, the end result yields that the ring gear 410 revolves four revolutions CW and additional three revolutions CCW, i.e. one revolution CW. In the present example, for every 1000 revolutions of the input, the calculation yields 900−3·(1000−100)=600.

Thus, several transmission ratios may be defined as shown in the following table:

TABLE 3

| Input revolution speed | Transfer ratio | Transfer revolution | Output revolution | I/O ratio |
|---|---|---|---|---|
| 1000 | 1 | 1000 | 1000 | 1:1 |
| 1000 | 0.95 | 950 | 800 | 1.25:1 |
| 1000 | 0.90 | 900 | 600 | 1.666:1 |
| 1000 | 0.85 | 850 | 400 | 2.5:1 |
| 1000 | 0.80 | 800 | 200 | 5:1 |
| 1000 | 0.75 | 750 | 0 | |

From the above table, it is observed that the transmission system provides a variety of input to output ratios (I/O), some of which are similar to those used in automotive vehicles. Therefore, according to one implication, the transmission system 1 may be used in an automotive vehicle providing an automatic transmission between the driving motor and wheels.

It should be noted that when the transfer ratio $D_{trans.}$ is reduced under a certain value, in the present example under 0.75, the output shaft 310 would tend to revolve in the opposite direction of the input shaft 110. This reduced value will be referred hereinafter as limit ratio $D_{limit}$. Such a reduced transfer ratio $D_{trans.}$ may occur when extra load is applied to the output shaft 310, or alternatively, at the beginning of operation of the system 1 when the rotor arrangement 234 has yet to pick up revolution speed.

This tendency of reversing the direction should have no effect when the transmission system 1 is applied in operated systems in which the revolution direction of the output shaft 310 is irrelevant. However, in systems in which such direction is important, an additional coupling device CD (shown FIG. 7A) may be attached to the output shaft 310, adapted to decouple the output shaft 310 from the operated system when the transfer ratio $D_{trans.}$ is below a predetermined value. Such an additional coupling device CD may be in the form of a clutch mechanism, a fluid coupling and even an additional planetary gear assembly etc.

Structure of the Stator

As previously discussed in the Background of the invention, fluid coupling mechanisms often comprise a stator mechanism adapted to overcome certain deficiencies in the operation of the fluid coupling. As previously noted, the transmission system 1 of the present invention further optionally comprises a stator mechanism which will now be described.

In the present invention, the stator arrangement 500 comprises a stator body 510 having a mounting portion 520 and a blade portion 530, comprising a plurality of stator blades 536. The stator body 510 is in the form of a section of a torus and is disposed about a central axis $X_s$.

In assembly, the stator 500 is mounted on the transfer shaft 210 such that the central axis X, is co-aligned with the central axis $X_t$ of the transfer shaft. The stator 500 articulated to the impeller arrangement 134 and the rotor arrangement 234 via a planetary gear system 600 similar to the previously discussed planetary gear system 400.

In this case, the stator body 510 is formed on the inner side of the torus with gear teeth constituting a ring gear 610 of the planetary gear mechanism 600. The transfer shaft 210 has mounted thereon a sun gear 620, and the cover 150 of the input chamber 120 has attached thereto a planet carrier 630 with three sets of planets 640S, 640I and 640R.

The additional planetary gear assembly 600 is chosen to have the same structure and ratios as the planetary gear assembly 400, whereby the operation of the stator 500 is almost identical to the operation previously described with respect to the transmission system 1, however, in this case, the output is directed to the stator 500.

Operation of the Stator

Starting from a rest position, when the motor is turned on and provides the input chamber 120 with rotary motion, the planet carrier 630 begins to revolve with a revolution speed of $V_i$. However, since the rotor arrangement 234 is yet to be set in motion by the impeller arrangement 134, the transfer ratio between the two is lower than a predetermined limit ratio $D_{limit}$. This in turn, causes that revolution of the planet carrier 630 in a CW direction entails revolution of the ring gear 610 and consequently the stator mechanism 500 in an opposite direction.

Thereafter, once the rotor arrangement 234 begins picking up revolution speed and reaching the predetermined transfer ratio, the stator body 510 is also forced to perform rotary motion due to the arrangement of the planetary gear system 600. The revolution speed of the stator body 510 increases along with the rotation speed of the rotor arrangement 234 such that when reaching a high revolution speed the stator body 510 revolves almost at the same speed as the rotor arrangement 234.

According to a specific embodiment of the present invention, the gears of the planetary gear assembly are so chosen that at the initial position, rotation of the impeller arrangement 134 in a CW direction entails rotary motion of the stator body 510 in a CCW direction. Once the rotor arrangement 234 begins picking up speed, the stator body will slow down and be brought to a complete halt, whereafter it will begin revolving in a CW direction similar to the impeller arrangement 134 and rotor arrangement 234.

It should also be understood that although described herein to have a stator mechanism 500, the transmission system 1 is not limited to a design including such a mechanism 500 and may very well be used with only an impeller arrangement 134 and a rotor arrangement 234 as previously disclosed.

Second Embodiment

Figure 8:
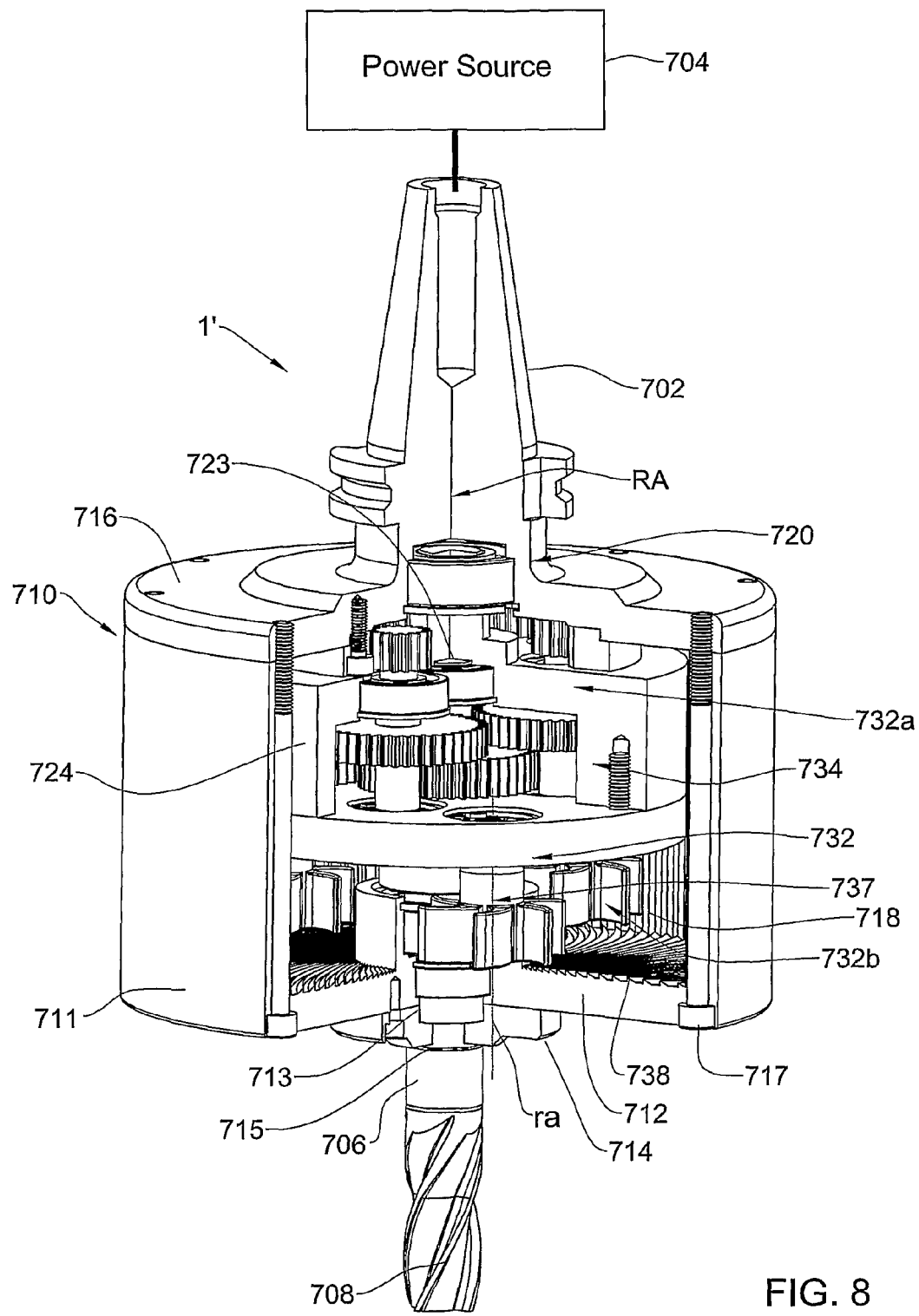
FIG. 8 is a cut-away cross-sectional view of the transmission system according to another embodiment of the present invention.
Figure 9:
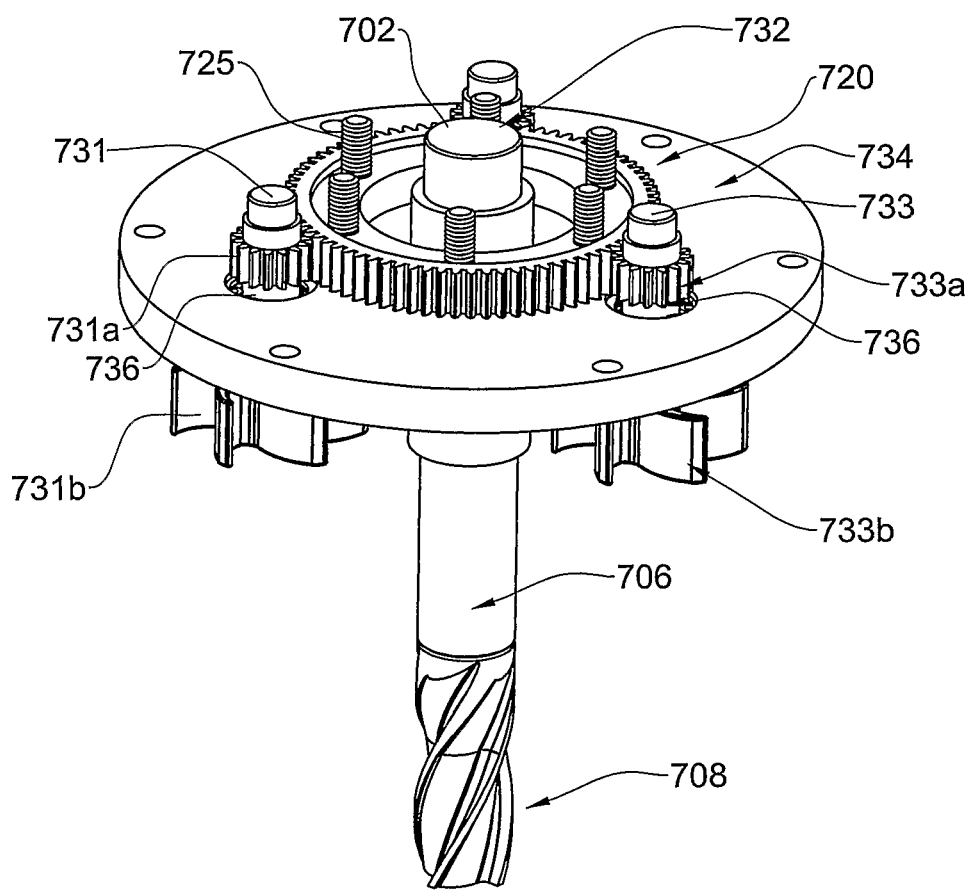
FIG. 9 is an isometric view more particularly illustrating the planetary gear carrier in the planetary gear assembly used in the transmission system shown in FIG. 8.
Figure 10A:
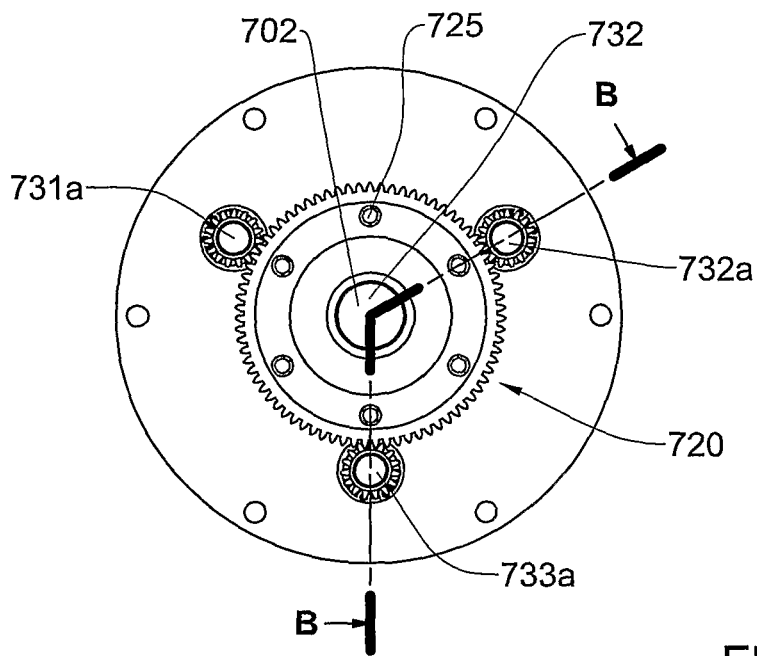
FIG. 10A is a top view of the transmission system shown in FIG. 8.
Figure 10B:
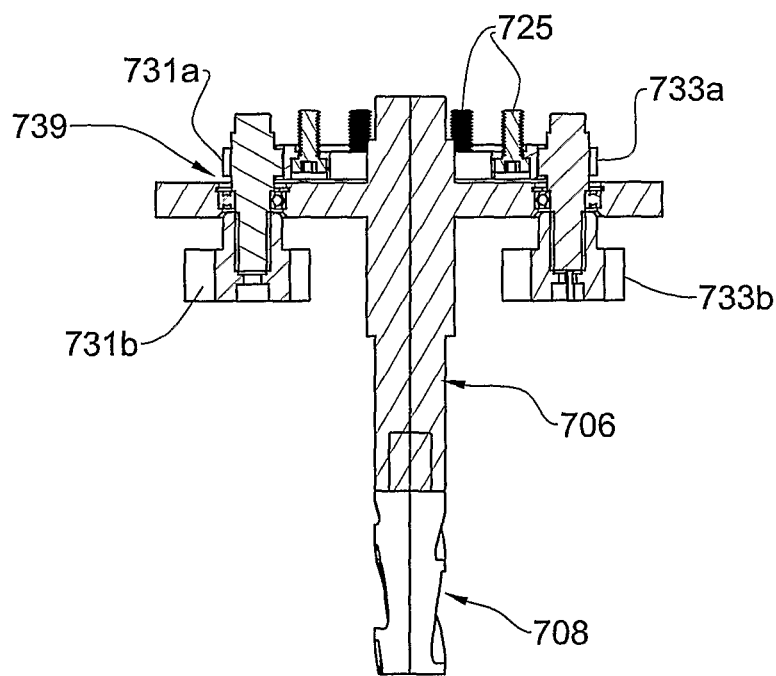
FIG. 10B is a longitudinal cross-section taken along line B-B in FIG. 10A.
Figure 11:
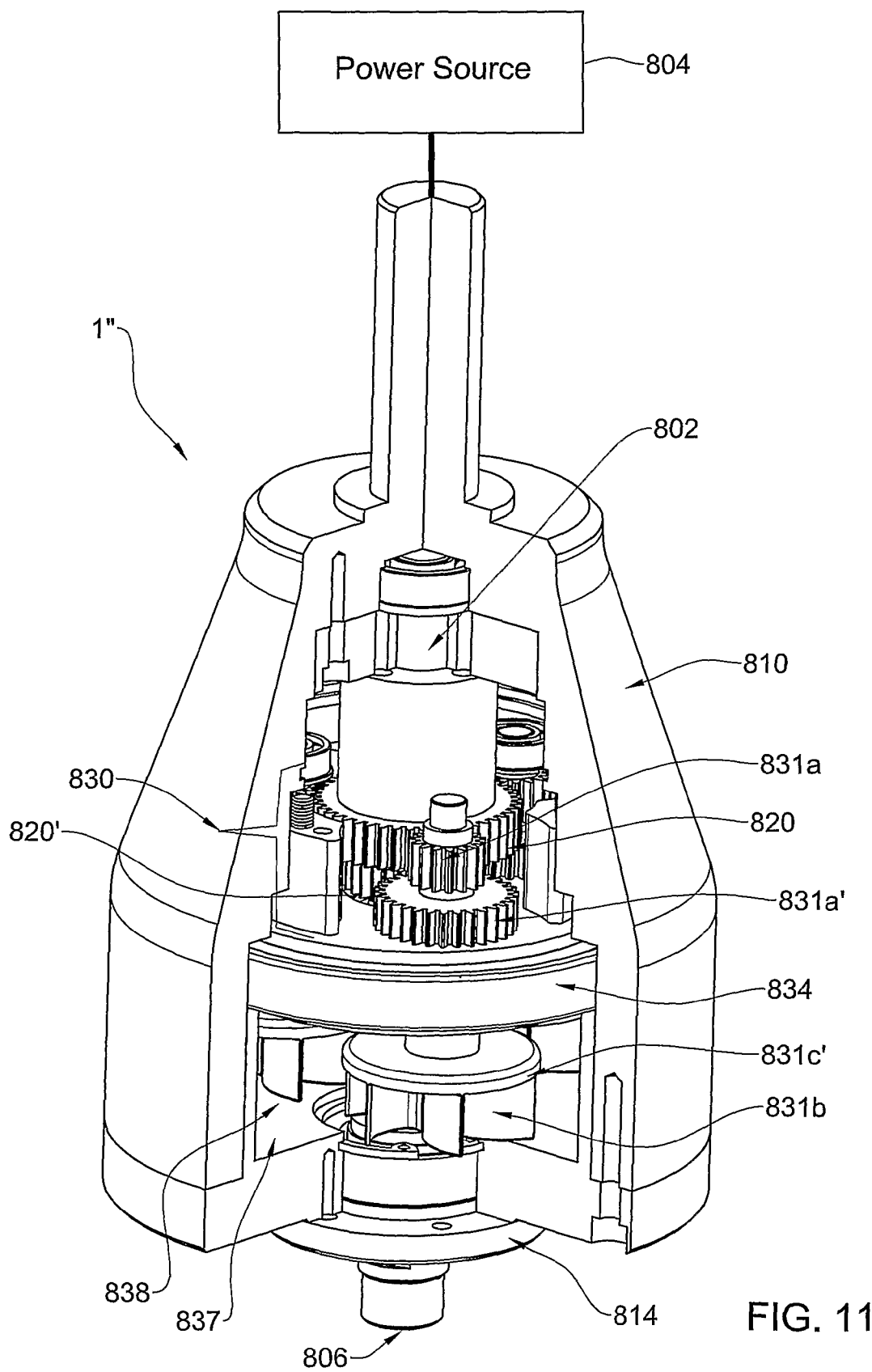
FIG. 11 is a cut-away cross-sectional view of a transmission system according to yet another embodiment of the present invention.
Figure 12:
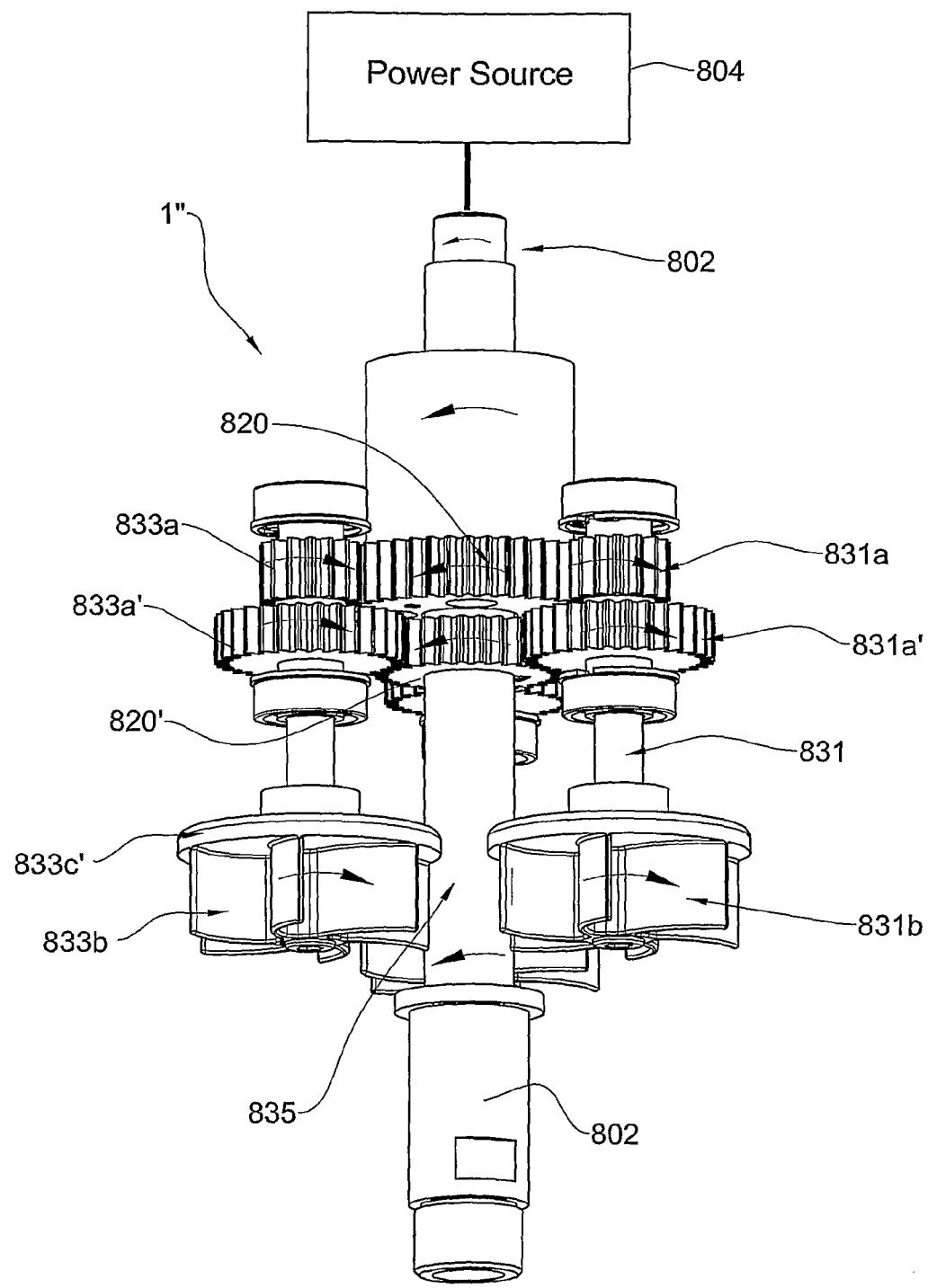
FIG. 12 is an isometric view of the main components used in the transmission system shown in FIG. 11.

Turning now to FIGS. 8 to 10, a transmission system according to another embodiment generally designated 1', is shown comprising an input shaft 702 which may be coupled to a power source 704, such as an electrical motor, and an output shaft 706 carrying a rotary device, such as a drill 708. The transmission system 1' comprises an input chamber, generally designated 710, having a first portion 710a adapted for accommodating a coupling fluid and a second portion 710b housing therein a planetary gear assembly which is coupled to the input shaft 702 so as to rotate therewith. The housing 710 is of cylindrical configuration, including a cylindrical side wall 711 closed by a circular bottom wall 712 formed with a central opening 713 for accommodating the output shaft 706. Opening 713 in bottom wall 712 is covered by an aperture sealing plate 714 formed with a central aperture 715 for accommodating the output shaft 706.

Figure 1C:
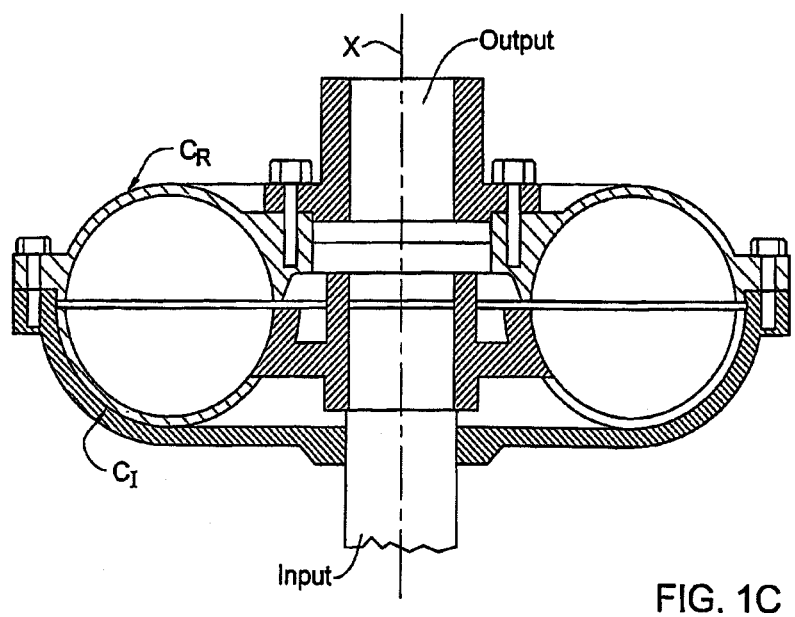
FIG. 1C is a schematic cross-sectional view of a fluid coupling known in the art.

Housing 710 further includes a cover 716 fixed to the input shaft 702 and also fixed to cylindrical side wall 711 of housing 710 by a plurality of bolts 717 (FIG. 1), so that the housing 710 rotates with the input shaft 702. The inner surface of the cylindrical side wall 711 (and also of the bottom wall 712) is grooved as shown at 718, or otherwise roughened, for purposes to be described below.

The sun gear 720 is secured to the cover 716 of the housing 710 so as to rotate therewith when driven by the input shaft 702 about rotary axis RA. The sun gear 720 is formed with external teeth 721 and with a central opening 722 for mounting the sun gear within an axial extension 723 formed in the lower surface of cover 716. Sun gear 720 is mounted to the cover by a mounting plate 724 receiving a plurality of fasteners 725 (FIG. 3) threaded to the cover plate. Mounting plate 724 is formed with three openings 726 equally spaced around the circumference of the mounting plate for receiving the planet gears of a planet carrier 730 housed within housing 710.

The planet carrier 730 includes three planetary gears 731, 732, 733, carried by a circular plate 734 fixed to a central shaft 735 coaxial with, or a part of, the output shaft 702. Carrier plate 734 is rotatable about axis RA. It is formed with three openings 736 in alignment with openings 726 in the sun gear mounting plate 724, for receiving the three planetary gears 731-733 carried by the carrier plate 734.

Carrier plate 734 is of circular configuration, conforming to the circular configuration of the inner surface of housing side wall 711. It is dimensioned such that, when received within the housing, it defines, with bottom wall 712 of the housing, the second portion 710b, referred herein as fluid chamber 737. Fluid chamber 737 is preferably only partially filled with a coupling fluid, to barely cover the bottom of the chamber, i.e., the upper surface of bottom wall 712 of housing 710.

Each of the planet gears 731-733 includes a toothed section 731a-733a meshing with the external teeth 721 of sun gear 720, and a control section 731b-733b, in the form of a turbine, received within chamber 737 defined by the carrier plate 734 and bottom wall 712 of housing 710. Each of the three planet gears 731-733 is freely rotatable on carrier plate 734 about its own respective rotary axis ra, which is laterally spaced from the rotary axis RA of carrier plate 734, of sun gear 720, of input shaft 702 and of output shaft 706. For this purpose, each of the planet gears 731-733 may be mounted in its respective opening 736 of carrier plate 734 by a ball-bearing, as shown at 739 in FIG. 4.

As indicated earlier, the fluid chamber 737 defined by carrier plate 734 and bottom wall 712 of housing 710, is preferably only partly filled with a coupling fluid 738. Actually, the quantity of coupling fluid within chamber 737 is barely sufficient to immerse only the bottom of the turbine sections 731c-733c of the planet gears 731-733, when housing 710 is stationary. Thus, when housing 10 is not rotating, the coupling fluid 738 within chamber 737 has little effect on the rotation of the planet gears 731-733. Accordingly, when housing 710 is stationary, or rotating at a low speed, each of the planet gears is substantially freely rotatable about its own axis, and thereby effectively decouples the planetary gear carrier from the input shaft 702 via the sun gear 720.

On the other hand, when housing 710 is rotated by the input shaft 702, the fluid 738 within the fluid chamber 737 rotates in the same direction of rotation of the housing. As mentioned earlier, the inner surface of cylindrical side wall 711 and bottom wall 712 of housing 710 may be grooved or otherwise roughened for this purpose. The rotation of the coupling fluid within chamber 737 thus forces the coupling fluid outwardly by centrifugal force, where it engage the outer portions of the turbine sections 731b-733b of the planet gears 731-733. The outwardly-thrusted and rapidly-rotating coupling fluid, when engaging the outer portions of the turbine sections thus impedes or blocks the planet gears from rotating about their respective axes ra, thereby effectively coupling the planetary gear carrier 730 to the sun gear 720 of input shaft 702.

Figure 13:
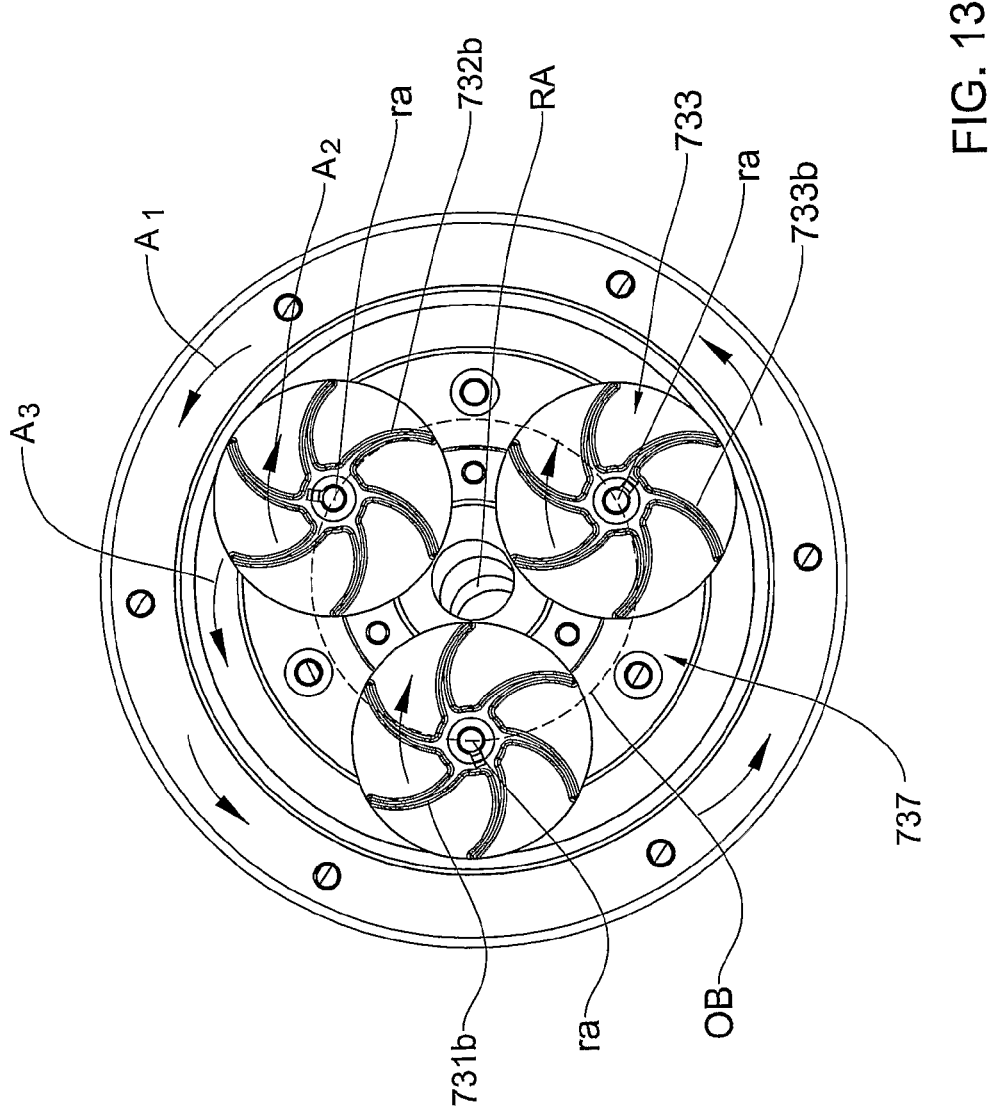
FIG. 13 is a bottom view of the turbine blades used in the transmission system shown in FIG. 11.
Figure 14:
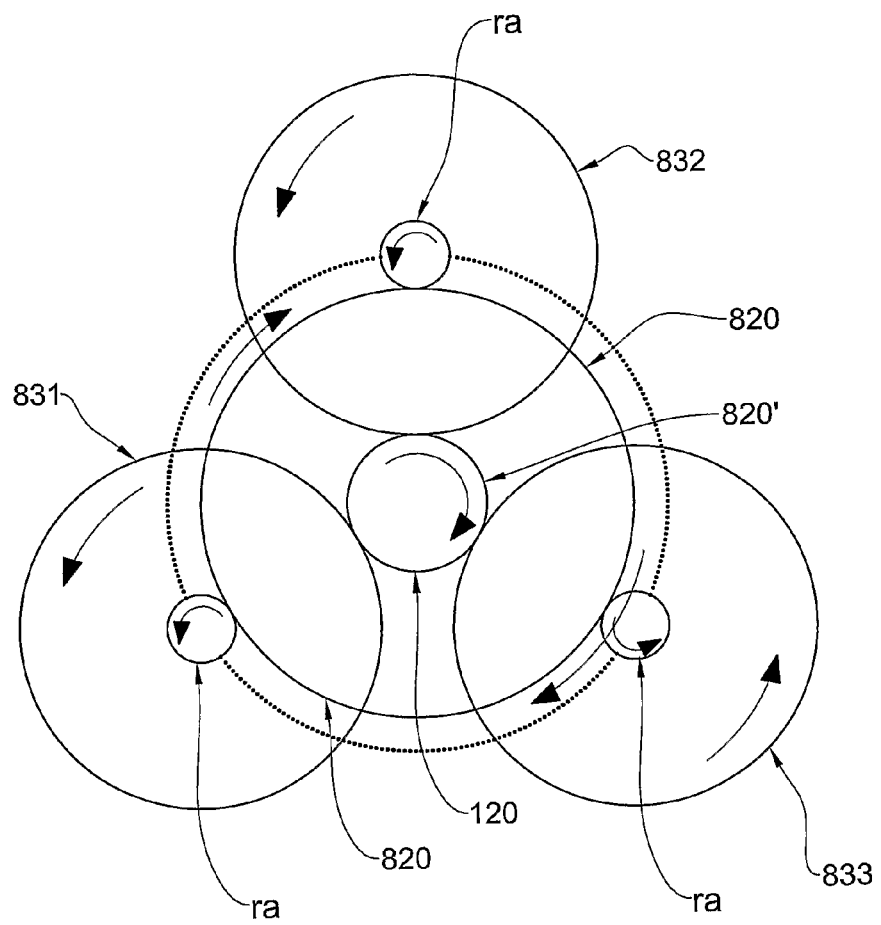
FIG. 14 is a schematic top view of the transmission system shown in FIG. 13 illustrating the operation thereof.

This is more particularly illustrated in the diagram of FIG. 13. Thus, in the example illustrated the input shaft 702, the sun gear 720, and the housing 710, are rotated in the counter-clockwise direction as indicated by arrow $A_1$. The planet gears 731-733, being in mesh with sun gear 720, would therefore be rotated about their respective axes in the opposite direction, as shown by arrow $A_2$. When housing 10 is static, or rotating at a very low speed, the coupling fluid 738 within chamber 737 has little effect on the rotation of the planet gears, such that they would rotate freely on their respective axes ra, thereby producing no rotation of the planetary gear carrier 30. In such case, the output shaft 706 is effectively decoupled from the input shaft 802.

Upon the rotation of the input shaft 702, housing 710 also rotates, which thereby rotates the fluid 738 within fluid chamber 737 in the same direction of rotation of the housing 710. The direction of rotation of the fluid within chamber 705 is indicated by arrow $A_3$ which, as shown in FIG. 13, is in the same direction of rotation of housing 710 as indicated by arrow $A_1$. As the speed of rotation of housing 710 increases, the coupling fluid within chamber 737 is forced outwardly by centrifugal force to engage the outer portions of the blades in each of the turbine sections 731b-733c of the planet gears 731-733, thereby increasingly impeding, and substantially blocking, the rotation of the planet gears about their respective axes ra. In particular, line O.B. denotes the boundary of the coupling fluid demonstrating that half of each planet gear 731-733 revolves within the medium of the coupling fluid with certain resistance while the other half revolves substantially in an air medium having little resistance or none at all. With the rotation of the planet gears blocked, the rotation of the sun gear 720 will cause the planetary gear carrier 730 to rotate around the sun gear and its axis RA, thereby effectively coupling the output shaft 706 of the planetary gear transmission to the input shaft 702.

It will be appreciated that the coupling as described above is a fluid coupling such that it can efficiently accommodate changes in the load on the output shaft. It will also be appreciated that the output shaft will rotate in the opposite direction as the input shaft, as indicated by arrows $A_2$ and $A_1$, respectively.

Third Embodiment

Attention is now drawn to FIGS. 11 to 14, in which another embodiment of the transmission system generally designate 1″ is shown having a similar design in many respects to that illustrated in FIGS. 8 to 10 and operating in a very similar manner, except that the output shaft rotates in the same direction as the input shaft. To facilitate understanding, reference numbers referring to corresponding parts in the transmission of the previous embodiment in FIGS. 8 to 10 are upped by 100, whereas new or substantially different parts are identified by reference numerals also upped by 100 but with the addition of a prime (xxx′).

The main difference is that in the transmission is that the output shaft is also driven by a sun gear. For this purpose, the planetary gear carrier 834 is not directly coupled to the output shaft 835 as in the previous embodiment but rather is coupled thereto via a second group of toothed sections 831a′-833a′ on the planet gears 831-833 meshing with a second sun gear 820 on output shaft 835. In the example illustrated in FIGS. 8 to 10, the input sun gear 820 is of larger diameter than the output sun gear 820, so that the toothed sections 831a-833a of the planet gears 831′-833′ meshing with the input sun gear 820 would be of smaller diameter than the toothed sections 831a′-833a′ of the planet gears meshing with the output sun gear 820′. The foregoing is illustrated, in an exaggerated manner, in the diagram of FIG. 14, wherein the arrows indicate the direction of rotation of the input and output shafts of the two sun gears, of the planet gears, and of the planetary gear carrier.

In all other respects, the planetary gear transmission illustrates in FIGS. 11 to 14 is constructed, and operates, substantially in the same manner as described above with respect to FIGS. 8 to 10.

Fourth Embodiment

Turning to FIGS. 15 to 18, and additional embodiment of the transmission system generally designate 1‴ is shown having a design similar to that of the transmission system 1″ shown in FIGS. 11 to 14, with the main difference that the rotary gear, generally designated 920, is an internally threaded ring gear, rather than an externally threaded sun gear as shown at 820 in FIGS. 11 to 14.

Figure 15:
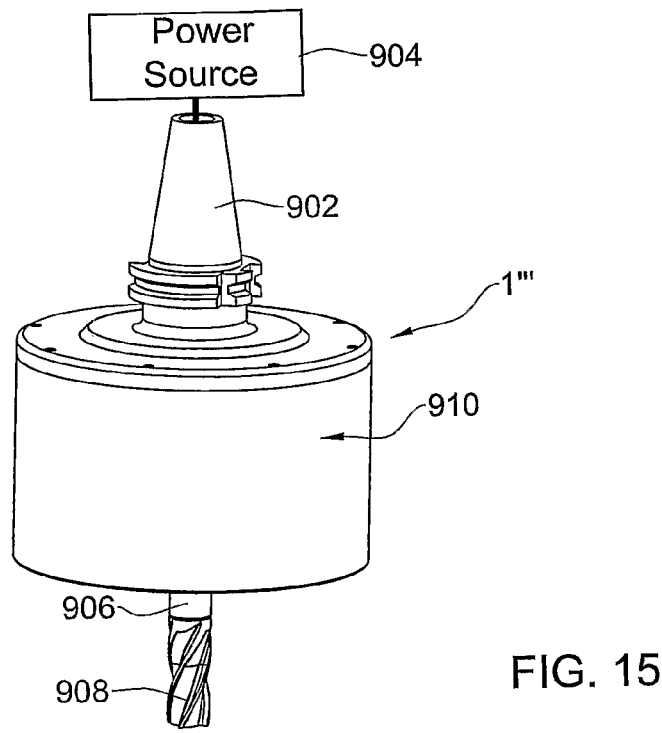
FIG. 15 is an isometric view of a transmission system according to still a further embodiment of the present invention.

FIG. 15 illustrates the transmission enclosed within housing 910 and connected to an input shaft 902 driven by a power source 904 selectively coupleable to an output shaft 906 for driving a load 908. For purposes of example, the load 908 is shown as an electrical drill driven by an electrical motor. As in the previously described examples, housing 910 rotates with the input shaft, and the output shaft 906 is hydraulically coupled to the input shaft via the planetary gear assembly within housing 910.

Figure 16:
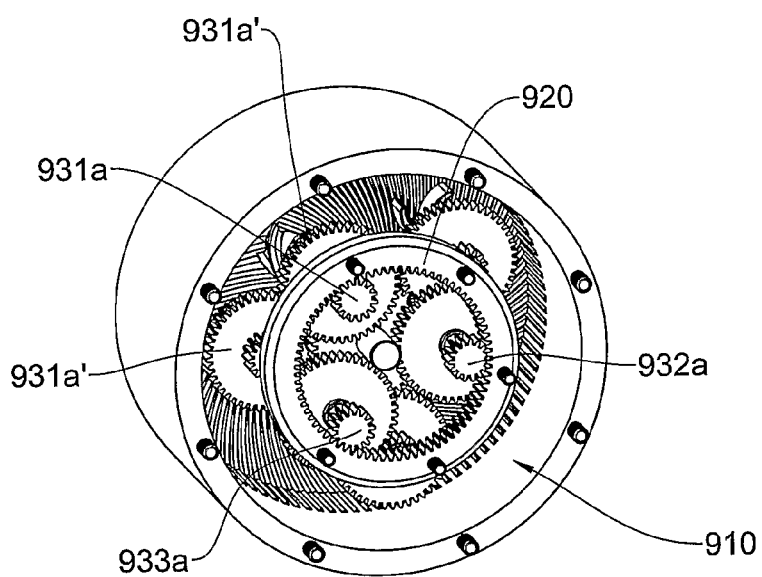
FIG. 16 is a bottom isometric view of the transmission system shown in FIG. 15.
Figure 17:
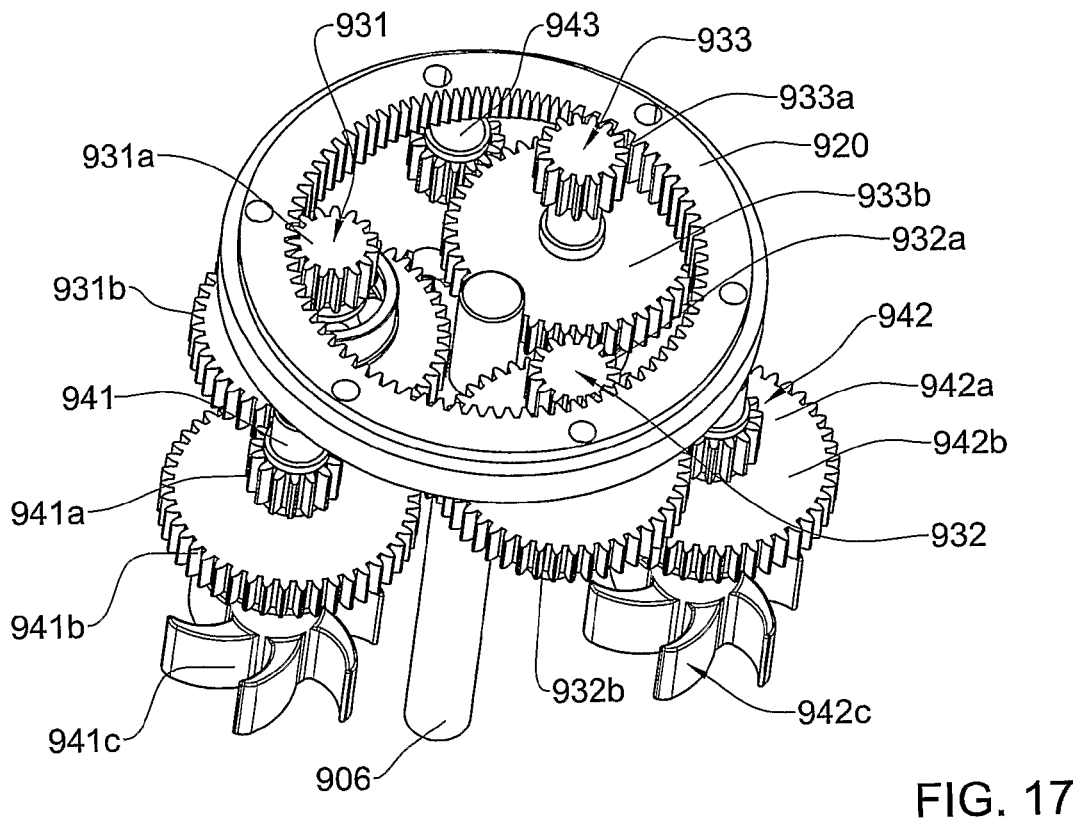
FIG. 17 is a top perspective view of the main components used in the transmission system shown in FIG. 16.
Figure 18:
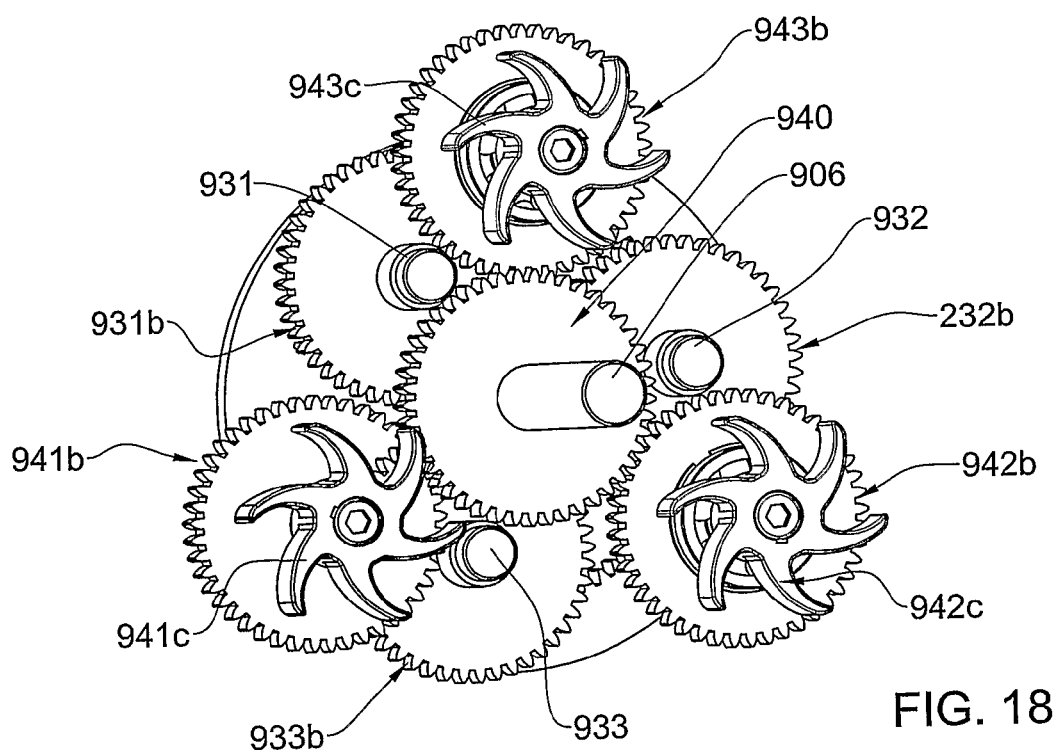
FIG. 18 is a bottom isometric view of the main components used in the transmission system shown in FIG. 16.

As best seen in FIGS. 16 and 17, the planetary gear assembly within housing 910 includes an internally toothed ring gear 920 driven by the input shaft, three planet gears 931-933 driven by the ring gear, and three further planet gears 941-943 driven by planet gears 931-933, respectively, and selectively coupling them to the output ring gear 940 coupled to the output shaft 906.

Thus, planet gear 931 includes a toothed section 931a meshing with the internal teeth of ring gear 920, and a second toothed section 931b meshing with toothed section 941a of another planet gear 941. Planet gear 941 includes a second toothed section 941b meshing with the output sun gear 940 and carrying the turbine section 941c rotatable within the fluid chamber (not shown), corresponding to fluid chamber 37 in the embodiment of FIGS. 8 to 10. It will thus be seen that turbine section 941c is initially effective to decouple the output sun gear 940 from the input ring gear 920 via planet gears 931 and 941, and then to couple them together upon the rotation of the housing 910, in the same manner as described above with respect to the embodiment of FIGS. 8 to 10.

The other two planet gears 932 and 933 similarly couple the output sun gear 940 to the input ring gear 920, via toothed sections 932b, 933b, meshing with toothed sections 942a, 942b of the respective planet gear 942, 943, which latter planet gears have further toothed sections 942b, 943b meshing with the output ring gear 940 and carrying the turbine sections 942c, 943c, moveable within the fluid chamber, corresponding to chamber 37 in FIGS. 8 to 10.

In all other respects, the planetary gear transmission illustrated in FIGS. 15 to 18 is constructed and operates in substantially the same manner as described above with respect to FIGS. 8 to 10 and 11 to 14, respectively.

Many other modifications can be made. For example, the flowable material may be a solid flowable material such as sand, powder, small granules, beads, and the like. In addition, when a coupling fluid, such as a hydraulic fluid, is used for the flowable material in the chamber, the chamber can be completely filled with the coupling fluid, rather than only partially filled, since the high centrifugal force produced in the outer region of the chamber, upon the rapid rotation of the chamber, will also impede the rotation of the planet gear about its respective axis.

Fourth Embodiment

Figure 19:
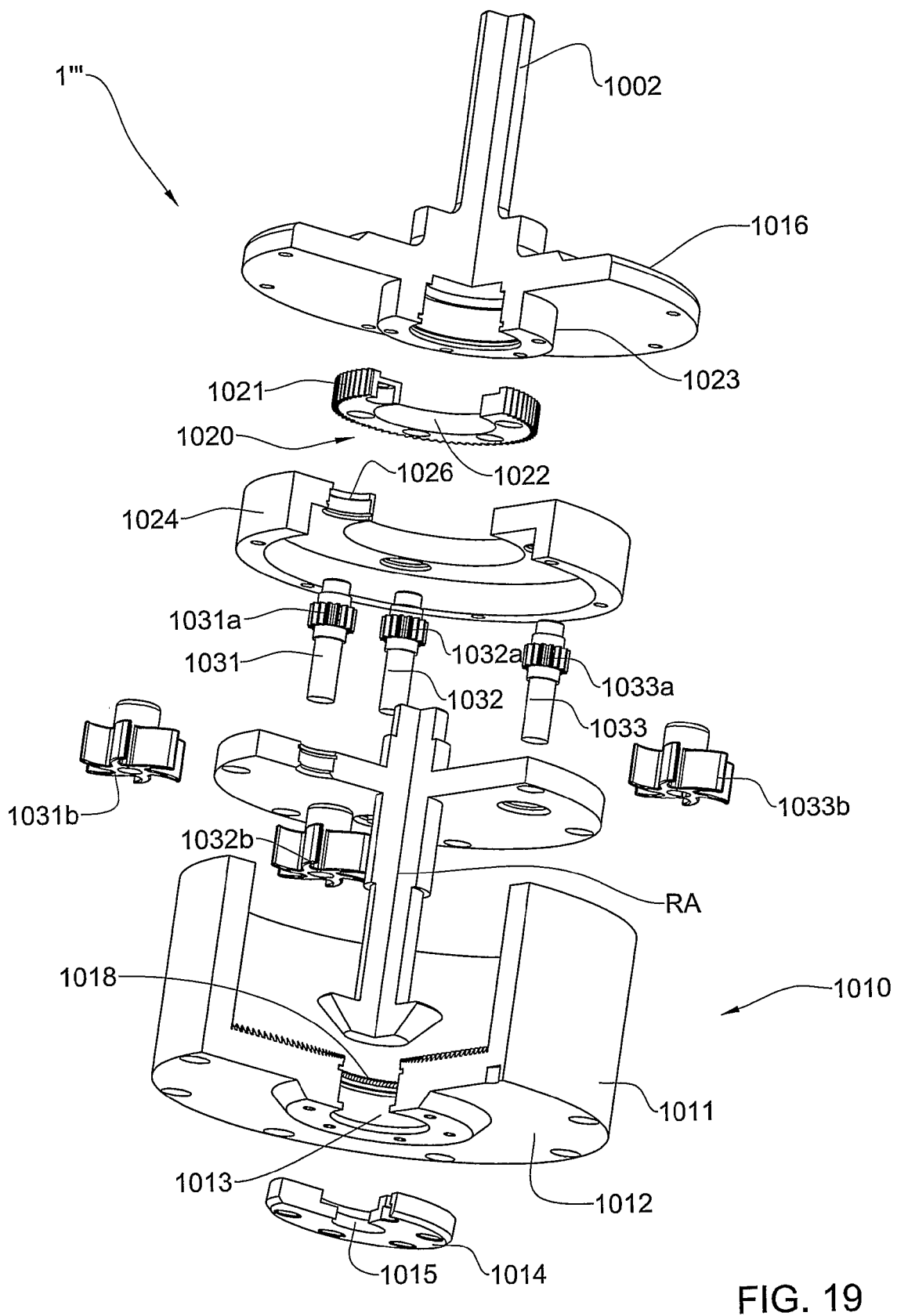
FIG. 19. is an exploded view, partly in section, illustrating the main components of a transmission system according to still another embodiment of the present invention.

With reference to FIG. 19, yet another embodiment of the transmission system, generally designated 1'''' is shown having a design similar to that of the previous three embodiments. In the present example, the transmission system 1'''' is used as a torque converter wherein any desired additional device may be mounted on the output shaft 1006.

In operation, the transmission system 1'''' according to the above embodiment is generally similar to the operation of the transmission system 1', 1'' and 1'''. Those skilled in the art to which this invention pertains will readily appreciate that numerous changes, variations, and modification can be made without departing from the scope of the invention, mutatis mutandis.

The invention claimed is:

1. A transmission system, comprising:
a planetary gear assembly comprising the following gear elements
   i a planet carrier;
   ii at least one planet gear mounted on said planet carrier;
and at least one of:
   iii a sun gear; or
   iv a ring gear;
a first-side mechanism comprising a chamber and a first-side shaft having
   a connection end connected to the chamber, and a free end;
   at least one transfer arrangement, comprising a transfer mechanism and a transfer shaft having a first end connected to the transfer mechanism; and
   a second-side mechanism comprising a second-side shaft;
wherein the chamber is fluidly coupled to the transfer mechanism for transfer of rotary motion therebetween, and wherein
   the chamber is connected to one of the gear elements (i), (iii), or (iv);
   the transfer shaft is connected to one of the gear elements (i), (ii), (iii), or (iv); and
   the second-side shaft is connected to one of the gear elements (i), (iii), or (iv);
   such that each of the gear elements is only coupled to one of the chamber, said transfer shaft, or the second-side shaft throughout the operation of the transmission system, and wherein the planetary gear assembly includes a multi-level planetary gear assembly comprising more than one of the following gear elements: the planet carrier (i), the at least one planet gear mounted on the planet carrier (ii), the sun gear (iii), or the ring gear (iv).

2. The transmission system according to claim 1, wherein one of the first-side and second-side shafts is set as input to thereby constitute an input shaft adapted to be connected to a driving source adapted to provide it with an input rotary motion, and the other is set as output to thereby constitute an output shaft adapted to output rotary motion.

3. The transmission system according to claim 1, wherein the fluid coupling between the chamber and the transfer mechanism is such that provides a transfer ratio Dtrans therebetween, and the arrangement being such that the chamber is free to perform rotary motion under constant power provided by a power source, while the change in the transfer ratio Dtrans is continuous.

4. The transmission system according to claim 2, wherein upon increase of the load exerted on the output shaft, the transfer shaft is caused to revolve slower than the chamber, thereby 'lagging behind' the gear element attached to the chamber.

5. The transmission system according to claim 1, wherein the chamber is in the form of an impeller comprising a plurality of impeller blades, the transfer mechanism is in the form of a rotor, also comprising a plurality of blades, the impeller and the rotor are arranged facing each other to form a fluid coupling.

6. The transmission system according to claim 1, wherein the transmission system further comprises an additional stator mechanism articulated to the impeller and the rotor using an additional planetary gear.

7. The transmission system according to claim 1, wherein the transmission is employed in an automotive vehicle.

8. The transmission system according to claim 1, wherein the transmission system is used as a torque converter adapted to reduce/increase input ranging from 1:10 to 1:10000.

9. The transmission system according to claim 8, wherein the transmission system operates at an efficiency of about 85% at a transmission ratio of 1:10.

10. The transmission system according to claim 8, wherein the transmission system operates at an efficiency of about 70% at a transmission ratio of 1:100.

11. The transmission system according to claim 8, wherein the transmission system operates at an efficiency of about 60% at a transmission ratio of 1:1000.

12. The transmission system according to claim 1, wherein the multi-level planetary gear assembly is a two-level planetary gear assembly.

13. The transmission system according to claim 12, wherein the planetary gear assembly comprises:
a set of sun rods, each sun rod having mounted thereon a first planet gear; and
a set of ring rods, each ring rod having mounted thereon on a mutual axis an idle planet gear adapted to mesh with the first planet gear, and a second planet gear adapted to mesh with the ring gear.

14. The transmission system according to claim 13, wherein the gear elements of the planetary gear assembly have the following ratios between teeth numbers:
idle planet gear—n teeth;
sun gear—n×15 teeth;
first planet gear—n×5 teeth;
ring gear—n×30 teeth; and
second planet gear—n×6 teeth.

15. The transmission system according to claim 1, wherein there exists a predetermined transfer ratio $D_{trans}=D_{limit}$ between the chamber and the transfer shaft, above which the second-side shaft revolves in the same direction as the first-side shaft, and below which the second-side shaft revolves in a direction opposite to that of the input shaft.

16. The transmission system according to claim 15, wherein the transmission further comprises an additional coupling device attached to the second-side shaft, and adapted, when the transmission system is connected to an operated system, for decoupling the second-side shaft from the operated system.

17. The transmission system according to claim 1, wherein the transmission system provides a transmission ratio ranging from 1:1 to 5:1 between the first-side shaft and the second-side shaft.

18. A vehicle, comprising:
a driving motor;
at least one driven member; and
a transmission system of claim 1;
wherein the first-side shaft of the transmission system is connected to the driving motor and the second-side shaft of the transmission system is connected to the at least one driven member.

19. A power tool, comprising:
a driving motor;
a footer adapted to receive therein a working tool; and a transmission system of claim 1; wherein the first-side shaft of the transmission system is connected to the driving motor and the second-side shaft of the transmission system is connected to the footer, the working tool is at least one of the following:
screwdriver;
and drill.

20. A boring device, comprising:
a driving motor;
a boring head; and
a transmission system of claim 1;
wherein the first-side shaft of the transmission system is connected to the driving motor and the second-side shaft of the transmission system is connected to the boring head.

* * * * *